(12) United States Patent
Kaplan et al.

(10) Patent No.: US 11,354,258 B1
(45) Date of Patent: Jun. 7, 2022

(54) CONTROL PLANE OPERATION AT DISTRIBUTED COMPUTING SYSTEM

(71) Applicant: Amazon Technologies, Inc., Seattle, WA (US)

(72) Inventors: Patricio Kaplan, Palo Alto, CA (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/038,623

(22) Filed: Sep. 30, 2020

(51) Int. Cl.
*G06F 13/16* (2006.01)
*G06F 15/173* (2006.01)
*G06F 13/38* (2006.01)
*G06F 13/24* (2006.01)

(52) U.S. Cl.
CPC ...... *G06F 13/1673* (2013.01); *G06F 13/1642* (2013.01); *G06F 13/1663* (2013.01); *G06F 13/1689* (2013.01); *G06F 13/24* (2013.01); *G06F 13/382* (2013.01); *G06F 15/17331* (2013.01)

(58) Field of Classification Search
CPC ............ G06F 13/1673; G06F 13/382; G06F 13/1663; G06F 13/24; G06F 13/1642
See application file for complete search history.

(56) References Cited

U.S. PATENT DOCUMENTS

| 6,115,747 | A | 9/2000 | Billings et al. |
| 7,260,615 | B2 | 8/2007 | Hooks |
| 7,286,548 | B1 | 10/2007 | Jair et al. |
| 9,985,903 | B2 * | 5/2018 | Shalev ................... H04L 1/1835 |
| 10,949,365 | B2 | 3/2021 | Jacobs et al. |
| 2004/0010612 | A1 | 1/2004 | Pandya |
| 2004/0093411 | A1 * | 5/2004 | Elzur .................. G06F 13/4027 |
| | | | 709/224 |
| 2005/0177537 | A1 | 8/2005 | Thompson |
| 2006/0020637 | A1 | 1/2006 | Kedem |
| 2006/0136570 | A1 | 6/2006 | Pandya |

(Continued)

OTHER PUBLICATIONS

U.S. Appl. No. 17/031,653, filed Sep. 24, 2020, Titled: Data Synchronization Operation At Distributed Computing System.

(Continued)

*Primary Examiner* — Raymond N Phan
(74) *Attorney, Agent, or Firm* — Kilpatrick Townsend & Stockton LLP

(57) ABSTRACT

In one example, an apparatus comprises: a first local memory, a computation engine configured to generate local data and to store the local data at the first local memory, and a controller. The apparatus is coupled with a host processor and a second device via an interconnect, the second device comprising a second local memory, the host processor hosting an application. The controller is configured to: receive, from the second device, a first message indicating that first data is stored in the second local memory; based on the first message: fetch the first data from the second local memory via the interconnect; control the computation engine to perform a computation operation on the first data to generate second data to support the application hosted by the host processor; and transmit, to the second device, a second message indicating that the second data is stored in the first local memory.

20 Claims, 28 Drawing Sheets

(56) References Cited

U.S. PATENT DOCUMENTS

| | | | |
|---|---|---|---|
| 2006/0236063 A1* | 10/2006 | Hausauer | G06F 12/1081 |
| | | | 711/170 |
| 2006/0256784 A1* | 11/2006 | Feng | G06F 13/28 |
| | | | 370/381 |
| 2006/0259661 A1* | 11/2006 | Feng | H04L 69/16 |
| | | | 710/39 |
| 2009/0077567 A1* | 3/2009 | Craddock | G06F 13/4022 |
| | | | 719/314 |
| 2009/0254647 A1* | 10/2009 | Elzur | H04L 67/1097 |
| | | | 709/223 |
| 2013/0198538 A1 | 8/2013 | Diab et al. | |
| 2015/0039712 A1* | 2/2015 | Frank | G06F 13/28 |
| | | | 709/212 |
| 2015/0088483 A1* | 3/2015 | Aarts | G06F 30/20 |
| | | | 703/14 |
| 2015/0281649 A1 | 10/2015 | Ehmann et al. | |
| 2017/0187621 A1* | 6/2017 | Shalev | H04L 45/745 |
| 2017/0346596 A1 | 11/2017 | Desimone et al. | |
| 2018/0102978 A1* | 4/2018 | Shen | H04L 12/4633 |
| 2019/0171612 A1* | 6/2019 | Shahar | G06F 15/17331 |
| 2019/0303297 A1 | 10/2019 | Fleming, Jr. et al. | |
| 2019/0347125 A1 | 11/2019 | Sankaran et al. | |
| 2019/0392297 A1 | 12/2019 | Lau et al. | |
| 2020/0151104 A1 | 5/2020 | Yang | |
| 2020/0174840 A1 | 6/2020 | Zhao et al. | |
| 2020/0178198 A1 | 6/2020 | Ding et al. | |
| 2020/0242258 A1 | 7/2020 | Smith et al. | |
| 2020/0314181 A1* | 10/2020 | Eran | G06F 15/17331 |
| 2020/0334195 A1* | 10/2020 | Chen | H04L 67/1097 |
| 2021/0076275 A1 | 3/2021 | Yiu et al. | |
| 2021/0117360 A1 | 4/2021 | Kutch et al. | |
| 2021/0149441 A1 | 5/2021 | Bartscherer et al. | |
| 2021/0342188 A1 | 11/2021 | Novakovic et al. | |

OTHER PUBLICATIONS

U.S. Appl. No. 17/031,668, filed Sep. 24, 2020, Titled: Memory Access Operation in Distributed Computing System.

Daoud, F. et al., "Asynchronous Peer-to-Peer Device Communication", OpenFabrics Alliance 13$^{th}$ Annual Workshop, Mar. 28, 2017, Mellanox Technologies, 26 pages.

* cited by examiner

CONTROL PLANE OPERATION AT DISTRIBUTED COMPUTING SYSTEM

BACKGROUND

A distributed computing system typically includes a cluster of inter-networked computing devices, in which each computing device can communicate and exchange data with each other to support a computation operation. Through parallelism, a distributed computing system can substantially reduce the time needed to complete the computation operation, especially a computation operation that operates on a large volume of data. Specifically, the computation operation can be split into multiple sub-operations, with each sub-operation operating on a subset of the data. Each computing device can receive a subset of the data from the network, and perform the sub-operation on the subset of the data in parallel to generate the output. As a result of the parallel processing, the time required to complete the computation operation can be substantially reduced compared with a case where the sub-operations are performed sequentially at a single computing device, which can lead to a substantial performance improvement. However, the performance improvement brought about by a distributed computing system can diminish due to various internal latencies at the computing device.

BRIEF DESCRIPTION OF THE DRAWINGS

Various embodiments in accordance with the present disclosure will be described with reference to the drawings, in which.

DETAILED DESCRIPTION

Figure 1A:
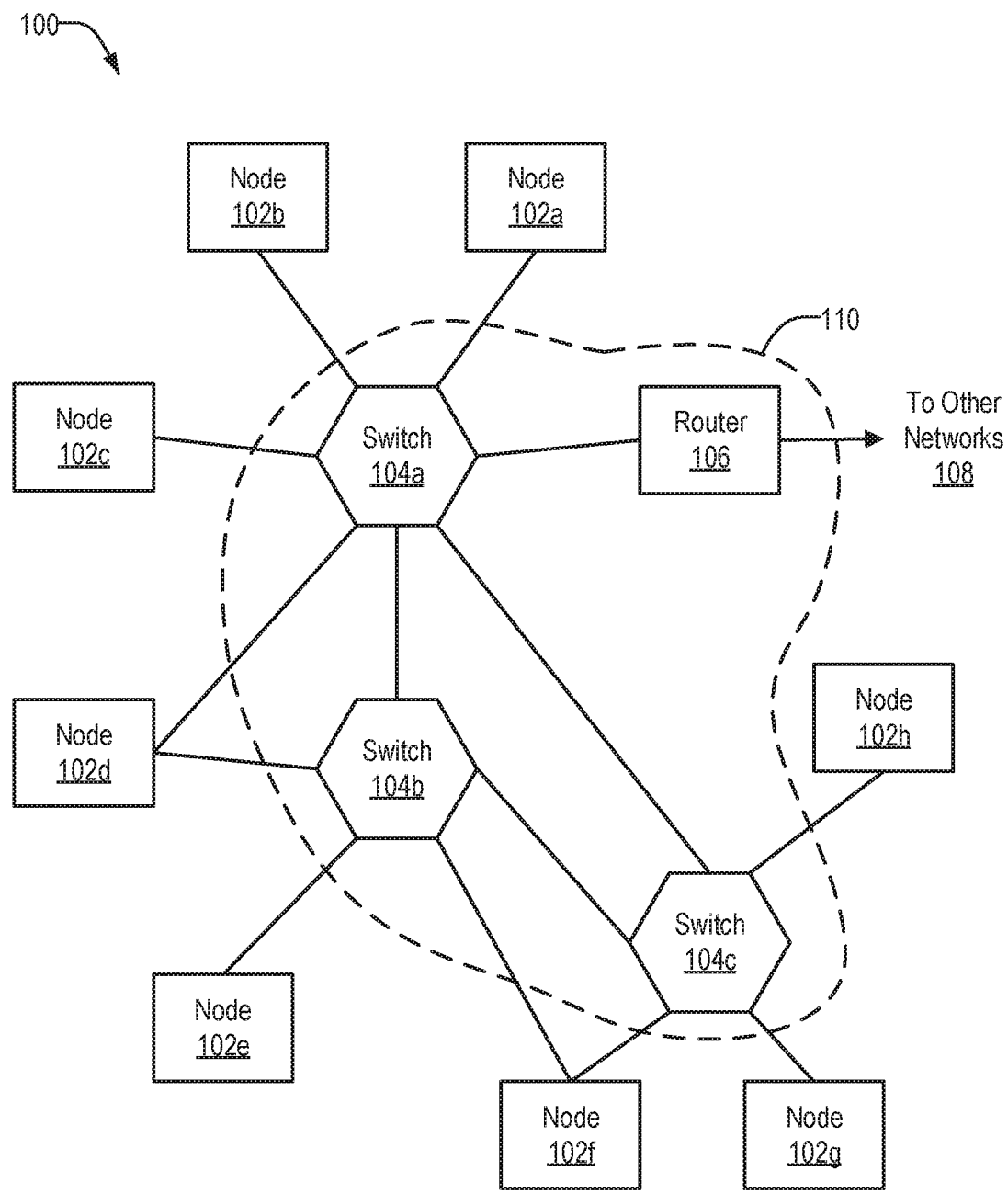
FIG. 1A, FIG. 1B, FIG. 1C, FIG. 1D, and FIG. 1E illustrate an example computing cluster and examples of distributed computation operations that can use techniques of the present disclosure.

A distributed computing system typically includes a cluster of inter-networked computing devices, in which each computing device can communicate and exchange data with each other to support a computation operation. Through parallelism, a distributed computing system can substantially reduce the time needed to complete the computation operation, especially a computation operation that operates on a large volume of data. Specifically, the computation operation can be split into multiple sub-operations, with each sub-operation operating on a subset of the data. Each computing device can receive a subset of the data from the network and perform the sub-operation on the subset of the data in parallel to generate the output.

Various computation operations can be performed by a distributed computing system, such as an artificial neural network computation operation. An artificial neural network (hereinafter, "neural network") is typically implemented in a computing system to have an architecture based on biological neural networks and to process input data in an analogous fashion to biological neural networks. A neural network typically includes a number of cascading neural network layers, with each layer including a set of weights. In an inference operation, a first neural network layer can receive an input data set, combine the input data set with the weights (e.g., by multiplying the input data set with the weights and then summing the products) to generate a first output data set for the first neural network layer, and propagate the first output data set to a second neural network layer, in a forward propagation operation. The second neural network layer performs another set of forward propagation operations on the first output data set to generate a second output data set and propagate the second output data set to higher neural network layers. The forward propagation operations can start at the first neural network layer and end at the highest neural network layer. The forward propagation operations at each neural network layer can represent different stages of extraction and processing of information from the input data set. A decision can then be made based on the output data of the highest neural network layer. For example, each neural network layer can extract and/or process features from an image, and a decision of whether an object is in the image can be generated based on a result of processing the extracted features at the neural network layers.

The set of weights of the neural network can be generated and/or updated by a training operation to improve the likelihood of the neural network generating a correct decision. An example training operation can use a gradient descent scheme. Specifically, as part of the training operation, a sequence of forward propagation operations can be performed on a training input data set, using the set of weights at each neural network layer, to generate a training output data set at the highest-level neural network layer. The training output data set can be compared with a reference output data set that supports a particular decision. A set of input data gradients can be generated based on, for example, differences between the training output data set and the reference output data set.

As part of the training operation, each neural network layer can then perform a sequence of backward propagation operations to adjust the set of weights at each neural network layer. Specifically, the highest neural network layer can receive the set of input data gradients and compute, in a backward propagation operation, a set of first data gradients and a set of first weight gradients based on applying the set of weights to the input data gradients in similar mathematical operations as the forward propagation operations. The highest neural network layer can adjust the set of weights of the layer based on the set of first weight gradients, whereas the set of first data gradients can be propagated to the second-highest neural network layer to influence the adjustment of the set of weights of the previous neural network layer. The backward propagation operations can start from the highest neural network layer and end at the first neural network layer. The set of weights at each neural network layer can be adjusted to complete one iteration of the training operation. The training operation can be repeated for the same input data set for a number of iterations until a loss objective (e.g., a threshold input data gradient) is achieved.

A training operation is typically a time-consuming process due to the sequential nature and data dependency among the operations involved in the training operation, and due to the large volume of training data involved in the training operation to cover different operation conditions. One way to accelerate the training operation is by using a distributed computing system to distribute the training operation across multiple computing systems, each of which can be configured as a worker node. A set of training input data can be split into multiple portions, with each portion to be processed by a worker node. Each worker node can perform the forward propagation operations independently, and in parallel with each other, based on a portion of the training input data, to generate intermediate outputs for each neural network layer.

After the forward propagation operations complete, each worker node can then perform the backward propagation operations to generate a set of weight gradients for each neural network layer. After the backward propagation operations, each worker node can perform an all-reduce operation, in which each worker node exchanges its set of weight gradients with other worker nodes, and determines a set of average weight gradients based on averaging the locally generated set of weight gradients with the sets of weight gradients received from other worker nodes. As a result of the all-reduce operation, each worker node can have the same set of averaged weight gradients. Each worker node can update the weights for each neural network layer based on the same set of averaged weight gradients. Each worker node can then perform another batch of forward and backward propagation operations using the updated weights on another set of training input data to further update the weights. At the end of the training operation, the worker nodes can also transmit the updated weights to a central repository, where the updated weights received from different worker nodes for each neural network layer can be averaged and stored as part of the neural network model. The weights can then be retrieved by another computing system to perform an inferencing operation.

Although a distributed computing system can substantially reduce the time required to complete a computation operation, the performance improvement brought about by a distributed computing system can diminish due to various internal latencies at the computing device. One major source of internal latency can be attributed to the control plane of the computing device which controls the movement of data in and out of the computing system, as well as the generation and movement of data within the computing system. Specifically, the computing device may include a host processor, a hardware data processor (e.g., a neural network hardware accelerator), and a network adapter. The host processor, the hardware data processor, and the network adapter can be connected by an interconnect, such as a Peripheral Component Interconnect Express (PCIe) interconnect. In a case where the host processor of a computing device is involved in the movement of data between the hardware data processor and the network adapter, the host processor may obtain packets of input data (e.g., weight gradients from other computing devices) from the network adapter, extract the input data from the packets (e.g., to determine whether there are missing/corrupted packets), and forward the input data to the hardware data processor. Moreover, the host processor may also obtain output data (e.g., locally generated weight gradients) from the hardware data processor, generate packets from the output data, and forward the packets to the network adapter for transmission over the network. Such arrangements, however, can add substantial latency between the flow of data between the hardware data processor and the network adapter, as the data may need to go through multiple protocol/software stacks at the host processor before being transmitted to the hardware data processor (as input data) or to the network adapter (as output data). The software overhead at the host can delay the start of computation operation at each computing device that depends on the exchange of data (e.g., weight gradients) over the network, which can substantially increase the overall completion time of the distributed computation operation.

Various protocols can be implemented to reduce the host processor's involvement in the transfer of the data between hardware data processors over the network, or over the peer-to-peer interconnect, to reduce the data transfer latency. For example, the network adapter may implement a remote direct memory access (RDMA) protocol. With RDMA protocol, packets received from the network can be transferred directly to the local memory of hardware data processor, via the interconnect, with minimum intervention from the host processor. To support the RDMA protocol, the network adapter can implement a queue pair comprising a send queue (SQ) and a receive queue (RQ), as well as completion queue (CQ). The SQ can be used to schedule transmission of messages, which may include read operations at the memory of the hardware data processor to obtain data for packet generation and transmission. The RQ can be used to schedule reception of messages, which can include write operations at the memory of the hardware data processor to store data of packets received from the network. Upon completing a task in the SQ or the RQ, a completion queue element (CQE) can be posted in the CQ. The CQ can be mapped to, for example, a memory that supports a control plane function.

While the hardware data processor is not directly involved in the transfer of the data over the network (e.g., the hardware data processor is not involved in generating the network packets), the host processor may implement the control plane function to control the movement of data into and out of the hardware data processor via the network adapter, and to control the generation of data at the hardware data processor. The communication among the host processor, the hardware data processor, and the network adapter via the interconnect to support the control plane function can delay the start of the generation of data at the hardware data processor and the transmission of the data from the hardware data processor to the network adapter, all of which can add latency to the distributed computation operation.

First, implementing the control plane function at the host processor can delay the start of the generation of data at the hardware data processor. Specifically, when input data (e.g., partial averaged weight gradients, input data) arrives at the network adapter from another worker node, a work queue element (WQE) can be posted at the RQ. The network adapter can then generate write descriptors via the mapping between the RQ and the local memory of the hardware data processor, and send the write descriptors to the hardware data processor. The hardware data processor can then execute the write descriptors to fetch the input data from the network adapter via the interconnect, which can buffer some of the input data. After sending the input data to the interconnect, the network adapter can send a transfer complete message, such as a CQE, to the host processor, via the mapping of the CQ to the host memory. The CQE can be sent to the host memory via the interconnect. Upon receiving the transfer complete message, the host processor can send a start message to the hardware data processor via the interconnect. The start message can trigger the hardware data processor to perform a computation operation (e.g., a forward/backward propagation operation, an all-reduce operation) on the input data to generate output data. The transmissions of the transfer complete message to the host via the interconnect, together with the transmission of the start message from the host via the interconnect, can incur a substantial roundtrip delay (e.g., a few microseconds). Moreover, it also takes a considerable amount of time for the host processor, which is typically a general-purpose central processing unit (CPU) and may be running other applications, to process the transfer complete message from the network adapter and to generate the start message. All of these must be completed before the hardware data processor can start the computation operation. The start of the generation of data at the hardware data processor will be delayed, which also increases the completion time of the distributed computation operation.

Moreover, implementing the control plane function at the host processor can delay the transmission of the output data from the hardware data processor to the network adapter. Specifically, after the hardware data processor completes the computation operation and generates the output data, the hardware data processor sends a computation complete message to the host processor via the interconnect. Upon receiving the computation complete message, the host processor can post a WQE at the SQ of the network adapter via the mapping of the SQ to the host memory. The host processor can also transmit an output data transfer message, which can be via a doorbell interrupt signal, to the network adapter. The transfer message can trigger the network adapter to fetch the output data from the memory of the hardware data processor (e.g., by sending read descriptors to the hardware data processor), generate packets including the output data, and transmit the packets to the network. The transmissions of the computation complete message to the host via the interconnect, together with the transmission of the output data transfer message from the host (via the interconnect or via the interrupt signal), can also incur a substantial roundtrip delay. Moreover, it also takes time for the host processor to process the computation complete message from the data processor and to generate the output data transfer message. All of these can delay the start of transmission of the output data over the network. Computations at other nodes that rely on the output data from the hardware data processor will also be delayed, which further increases the completion time of the distributed computation operation.

Examples of the present disclosure relate to a control plane function in a computing device, and more specifically, to controlling the generation of data at a hardware data processor (e.g., a neural network hardware accelerator) as well as the transfer of data between the hardware data processor and the network adapter, both of which are part of a computing device. The host processor, the hardware data processor, and the network adapter can be connected by an interconnect, such as a PCIe interconnect. The hardware data processor includes a computation engine to perform computation operations, as well as a local memory to support the computation operations. In addition, the hardware data processor further includes a controller to implement the aforementioned control plane function, as well as a direct memory access (DMA) engine to perform write/read operations to the local memory. The control plane function can control generation of data at the hardware data processor, as well as the transfer of data between the hardware data processor and the network adapter over the interconnect.

Specifically, to support the control plane function at the hardware data processor, the CQ of the network adapter can be mapped to the local memory of the hardware data processor. When input data (e.g., partial averaged weight gradients) arrives at the network adapter from another worker node, the network adapter can send write descriptors to the hardware data processor, which can execute the write descriptors to fetch the input data from the network adapter via the interconnect. After sending the input data to the interconnect, the network adapter can send a transfer complete message, such as a CQE, to the hardware data processor via the mapping of the CQ to the local memory of the hardware data processor. The CQE can also indicate a status of the reception of the data by the network adapter (e.g., whether there is any missing data, whether the data has arrived out of order, etc.). Upon receiving the transfer complete message, the controller can trigger the computation engine to perform a computation operation (e.g., a forward/backward propagation operation, an all-reduce operation) on the input data to generate output data (e.g., updated partial averaged weight gradients).

In addition, the controller of the hardware data processor can control the transmission of the output data from the hardware data processor to the network adapter. Specifically, after the computation engine completes the computation operation and generates the output data, the hardware data processor can post a WQE at the SQ of the network adapter via the mapping of the SQ to the host memory. The hardware data processor can also transmit an output data transfer message, which can be via a doorbell interrupt signal, to the network adapter. The transfer message can trigger the network adapter to fetch the output data from the memory of the hardware data processor (e.g., by sending read descriptors to the hardware data processor), generate packets including the output data, and transmit the packets to the network.

In the disclosed examples, while the host processor is not directly involved in controlling the generation and transmission of data at the hardware data processor, the host processor may still be involved in other aspects of the operations of the hardware data processor. For example, the host processor may transmit a high-level instruction to the hardware data processor via the interconnect to start/stop an operation (e.g., a training operation, an inferencing operation). The controller of the hardware data processor can then interact directly with the network adapter to fetch data from the network adapter and start a computation operation on the data without further instruction from the host processor. As another example, the host processor may have access to the local memories of the network adapter and of the hardware data processor to perform various debugging and monitoring operations, as well as error handling operations. For example, as part of the debugging operation, the host processor can set breakpoints or other conditions to start and suspend the execution of the computation operations at the hardware data processor. The host processor can also have access to the data stored at the local memory of the hardware data processor to support the debugging. For example, the hardware processor may transmit a read descriptor to the hardware data processor to fetch the input data and/or output data from the local memory of the hardware data processor to support a monitoring operation. Furthermore, the host processor may also detect a data error based on, for example, the status of the data reception from the CQE, the data stored in the local memory of the hardware data processor, etc. The host processor can handle the error based on pre-determined error handling policies to, for example, suspend or stop the computation operations at the hardware data processor.

With the disclosed techniques where the control plane function is implemented in the hardware data processor, the delay introduced by the host processor to the generation of data at the hardware data processor, and to the transfer of data between the network adapter and the hardware data processor, can be reduced. This can speed up the data generation and data transfer operations and improve the performance of the distributed system in handling a distributed computation operation, such as a distributed training operation of a neural network.

The disclosed techniques can also be applied to speed up data generation and data transfer between hardware data processors via a peer-to-peer interconnect (e.g., a peer-to-peer PCIe). Specifically, after the computation engine of a first hardware data processor completes a first computation operation to generate first data, the controller of the hardware data processor can send memory write instructions and the first data to a second hardware data processor via the peer-to-peer interconnect to store the first data at the local memory of the second hardware data processor without waiting for an output data transfer message from the host. Moreover, the second hardware data processor can start a computation on the first data after the first data is stored in its local memory without waiting for a start message from the host. All these can speed up the operations at the hardware data processor.

In the following description, various examples will be described. For purposes of explanation, specific configurations and details are set forth to provide a thorough understanding of the examples. However, it will also be apparent to one skilled in the art that the examples may be practiced without the specific details. Furthermore, well-known features may be omitted or simplified in order not to obscure the embodiments being described.

FIG. 1A illustrates an example of a computing cluster 100. Computing cluster 100 can include a group of computing resources connected with switches, and can be configured to run in parallel. In many implementations, the various computing resources form a single logical computing resource. The example computing cluster 100 illustrated in FIG. 1A includes multiple nodes 102a-h and switches 104a-c. In some implementations, computing cluster 100 may also include a router 106.

The nodes 102a-h illustrated in FIG. 1A may represent various computing resources. For example, one or more nodes 102a-h may be a computer, such as a server computer. Computers used in cluster applications may include one or more processors, and these processors may include one or more processing cores. These computers may also include memory and peripheral devices. In some implementations, these computers may use an adapter device to connect to a switch 104a-c in computing cluster 100. Other examples of computing resources include storage devices (e.g., hard drives), storage subsystems (e.g., an array of storage devices), input/output (I/O) modules, and hardware data processors, such as hardware neural network accelerators.

The switches 104a-c may provide connectivity between the various nodes 102a-h. Each node 102a-h may be connected to computing cluster 100 through a connection with a switch 104a-c. In some cases, a node 102a-h may be connected to more than one switch 104a-c. Switches may also be connected to other switches. In most cases, any port on a switch 104a-c may be used to connect to either a node 102a-h or another switch. In most implementations, the size of computing cluster 100 can quickly and easily be expanded by connecting more switches and nodes.

The network of switches 104a-c may provide multiple paths from any node 102a-h to any other node 102a-h. A switch 104a-c may have multiple connections with another switch 104a-c, which provides additional paths between the switches 104a-c. In some cases, the nodes 102a-h may be connected to more than one switch 104a-c, also creating more paths. Packets from one node 102a-h may use multiple paths at the same time to reach another node 102a-h. Alternatively or additionally, packets from one node 102a-h to another node 102a-h may follow only one path. In some cases, at each switch 104a-c, a decision may be made as to which path a packet will follow. In other cases, a packet's path may be determined in advance, typically at the source node. A stream of packets from one node 102a-h to another node 102a-h may be referred to as a "packet flow," or simply as a "flow." In some cases, the packets in a flow are related, such as, for example, when the packets together form one message.

In some implementations, computing cluster 100 may be connected to a router 106. The router 106 may provide a connection to other networks 108, such as other clusters or sub-networks (subnets), local area networks (LANs), wide area networks (WANs), or the Internet.

The interconnected switches 104a-c (and the router 106, if present) may be referred to as a "switch fabric," "fabric," or more simply "network." Herein, the terms "fabric" and "network" may be used interchangeably.

Computing cluster 100 may provide more computing power and better reliability. The individual computing resources may work cooperatively to solve a large problem that one computer may not be able to solve alone, or may take a very long time to solve alone. In some cases, a computing cluster may provide performance similar to a super-computer but for less cost and with less complexity. The switched fabric architecture used by a computing cluster may also have the advantage of being fault tolerant and scalable. In a switched fabric architecture, typically every link has one device attached at each end of a link. Hence, each link is only depending on the behavior of, at most, two devices. A switched fabric may also be easily scaled by adding more switches, which provides more ports to attach more nodes. In some cases, adding more switches may increase the aggregate bandwidth of the cluster. Multiple paths between the nodes may also keep aggregate bandwidth high and provide redundant connections in case of link failures.

Computing cluster 100 may be used for various applications, such as high-performance computing. High-performance computing involves using parallel processing to run compute-intensive applications. Scientific researchers, engineers, and academic institution staff may use high-performance computing for complex modeling or simulations, such as, for example, car crash simulations, weather modeling, or atomic simulations. In addition, computing cluster 100 may be used for financial applications, distributed storage, and databases. Financial applications, such as high-frequency trading, may also examine large amounts of data and are generally relied upon to react quickly (i.e., much faster than a human being) to changes in the data. Distributed storage allows very large amounts of data to be accessed from multiple locations. Storage area networks are one form of distributed storage. Databases also store a large amount of data and must provide fast ways to locate specific information stored within the database.

Figure 1B:
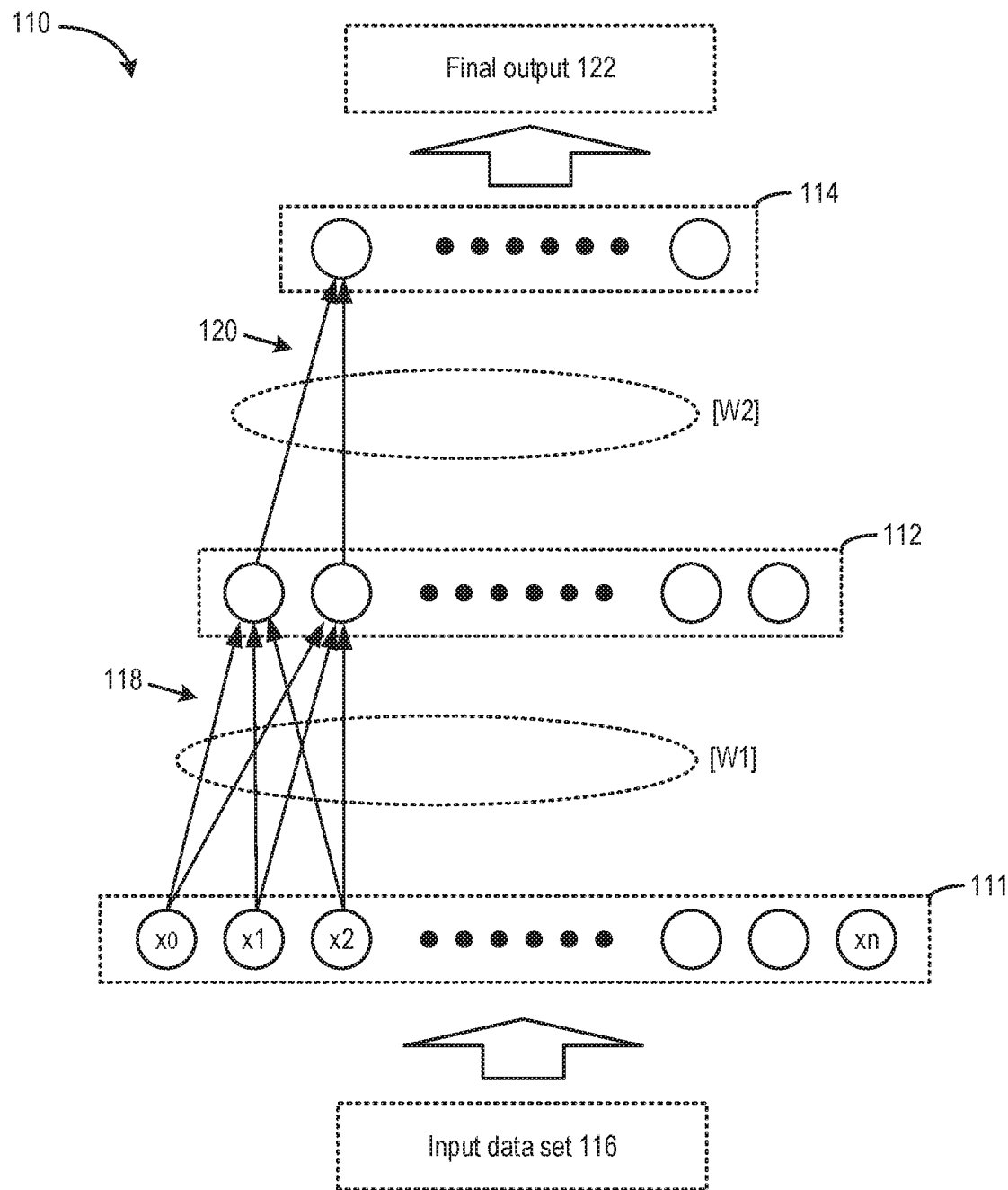

In some examples, computing cluster 100 can be used to support neural network computation operations. A neural network is typically implemented in a computing system to have an architecture based on biological neural networks and to process input data in an analogous fashion to biological neural networks. FIG. 1B illustrates an example of an artificial neural network 110. As shown in FIG. 1B, a neural network typically includes a number of cascading neural network layers, including first neural network layer 111, second neural network layer 112, third neural network layer 114, etc. Each layer may be associated with a set of weights, such as weights labeled "[W1]" and "[W2]". In an inference operation, first neural network layer 111 can receive an input data set 116, which can include, for example, image data, audio data, medical data, or other type of data to be analyzed. First neural network layer 111 can combine input data set 116 with the weights [W1] (e.g., by multiplying the input data set with the weights and then summing the products) to generate a first output data set 118 for first neural network layer 111 and propagate first output data set 118 to second neural network layer 112, in a forward propagation operation. Second neural network layer 112 performs another set of forward propagation operations on first output data set 118 from first neural network layer 111 to generate a second output data set 120 and propagate second output data 120 set to third neural network layer 114. In FIG. 1B, third neural network layer 114 can be the highest output neural network layer and can generate a final output 122, including a decision/prediction made about input data set 116. Final output 122 may indicate, for example, whether an image contains a target object, information contained in audio data, or a clinical prediction of a patient.

Figure 1C:
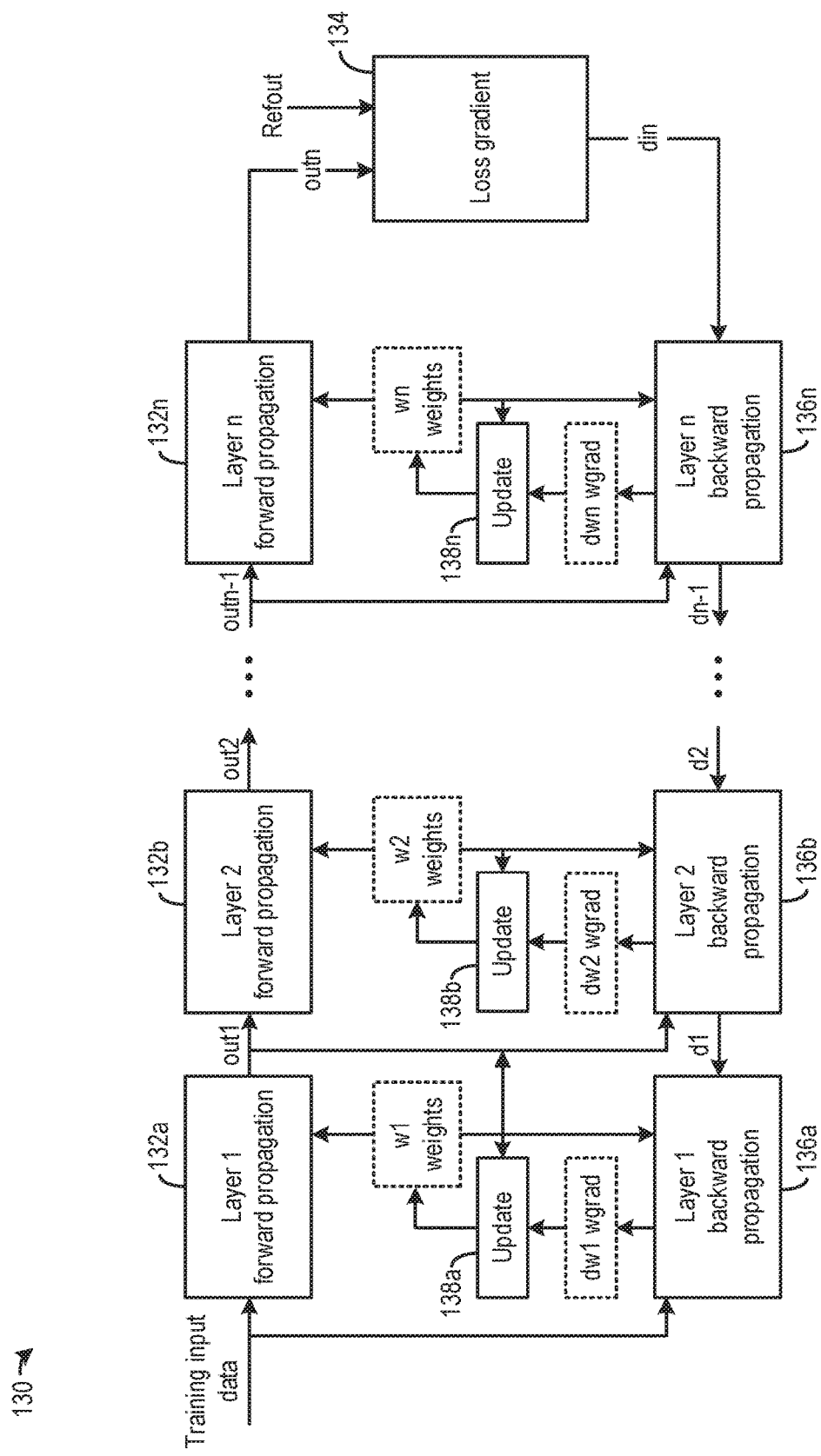

The set of weights of neural network 110 can be generated and/or updated by a training operation to improve the likelihood of the neural network generating a correct decision. FIG. 1C illustrates an example of a training operation 130, based on a gradient descent scheme. Specifically, as part of the training operation, a sequence of forward propagation operations, including operations 132a, 132b, and 132n, can be performed on a training input data set, using the set of weights at each neural network layer, to generate a training output data set (labeled "outn" in FIG. 1C) at the highest-level neural network layer. The training output data set can be compared with a reference output data set (labeled "refout" in FIG. 1C) that supports a particular decision. A set of input data gradients (labeled "din" in FIG. 1C) can be generated by applying a loss gradient function 134 on, for example, differences between the training output data set and the reference output data set.

As part of the training operation, each neural network layer can then perform a sequence of backward propagation operations 136 to adjust the set of weights at each neural network layer. Specifically, the highest neural network layer (e.g., third neural network layer 114) can receive the set of input data gradients and compute, in a backward propagation operation 136n, a set of first data gradients (labeled "dn-1"), and a set of first weight gradients (labeled "dwn wgrad"), based on applying the set of weights to the input data gradients in similar mathematical operations as the forward propagation operations. The highest neural network layer can perform a weight update operation 138n to adjust the set of weights of the layer based on the set of first weight gradients, whereas the set of first data gradients dn-1 can be propagated to the second-highest neural network layer to influence the adjustment of the set of weights of the previous neural network layer. The backward propagation operations can start from the highest neural network layer and end at the first neural network layer. The set of weights at each neural network layer can be adjusted at a respective update operation (e.g., update operations 138a, 138b, 138n) to complete one iteration of the training operation. The training operation can be repeated for the same input data set for a number of iterations until a loss objective (e.g., a threshold input data gradient) is achieved.

Figure 1D:
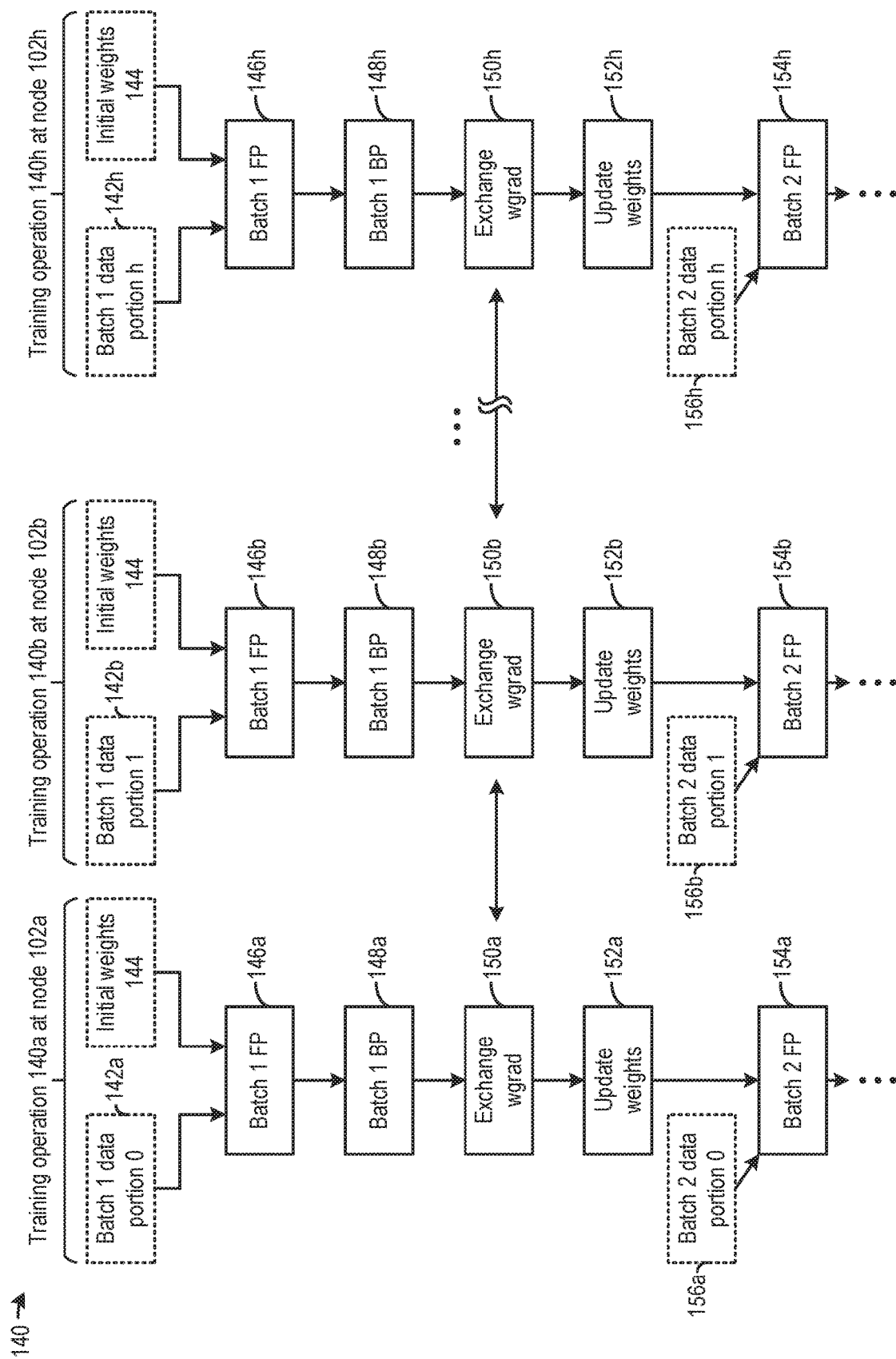

A training operation is typically a time-consuming process due to the sequential nature and data dependency among the operations involved in the training operation, and due to the large volume of training data involved in the training operation to cover different operation conditions. One way to accelerate the training operation is to distribute the training operation across a distributed computing system, such as computing cluster 100. FIG. 1D illustrates an example of a distributed training operation 140, which includes training operations 140a, 140b, and 140h, with each training operation performed at a node of computing cluster 100 such as nodes 102a-h, with each node configured as a worker node to perform a training operation. A first batch of training input data can be split into multiple portions 142a, 142b, 142h, etc., with each portion to be processed by, respectively, worker node/node 102a, 102b, and 102h. Each worker node can also receive the same initial set of weights 144 and perform the forward propagation operations 146 (e.g., forward propagation operations 146a, 146b, and 146h) independently, and in parallel with other, based on the received portion of the training input data and weights 144, to generate intermediate outputs for each neural network layer.

After the forward propagation operations 146 complete, each worker node can perform the backward propagation operations 148 (e.g., backward propagation operations 148a, 148b, and 148h) independently to generate a set of weight gradients for each neural network layer. After backward propagation operations 148, each worker node can perform an exchange operation 150 (e.g., exchange operations 150a, 150b, and 150h), in which each worker node exchanges its set of weight gradients with other worker nodes over the network, and then determines averaged weight gradients for each neural network layer. The purpose of exchange operations 150 is to ensure that each worker node has the same set of weight gradients at the end of backward propagation operations 148 and can apply the same set of weight gradients to initial weights 144 to obtain the updated weights in weights update operations 152 (e.g., weights update operations 152a, 152b, and 152h). Each worker node can then perform another batch of forward and backward propagation operations, such as forward propagation operations 154a, 154b, and 154h, using the updated weights on portions 156a, 156b, and 156h of a second batch of training input data to further update the weights. At the end of the training operation, the worker nodes can also transmit the updated weights to a central repository, where the updated weights received from different worker nodes for each neural network layer can be averaged and stored as part of the neural network model. The weights can then be retrieved by another computing system to perform an inferencing operation.

Compared with an arrangement where a single worker node is used to perform a training operation based on a large volume of training data, the distributed training operation 140 allows parallel training operation to be performed at multiple worker nodes, with each worker node operating on a portion of the training data. Such arrangements can substantially reduce the total time required to complete the training operation. But to achieve the most benefit from distributing the training operation over computing cluster 100, the protocol used for communication between nodes 102 of computing cluster 100 should provide high bandwidth and low latency. High bandwidth means that a large volume of traffic should be able to traverse the cluster, and low latency means that the traffic should be able to travel from source to destination as quickly as possible. Here, the source and destination refer to not only the nodes, but also to a process/operation on the nodes that releases and consumes the data, such as training operation 140a on node 102a and training operation 140b on node 102b. The total latency incurred in releasing the data from the source operation of a node into the network, transferring the data over the network, and delivering the data to the destination operation of another node, can slow down the execution of both the source and destination operations. For example, referring to FIG. 1D, worker node 102a completes the first batch of training operation 140a only after exchange operation 150a of weight gradients completes, and weights update operation 152a completes before starting the second batch of training operation 140a.

Figure 1E:
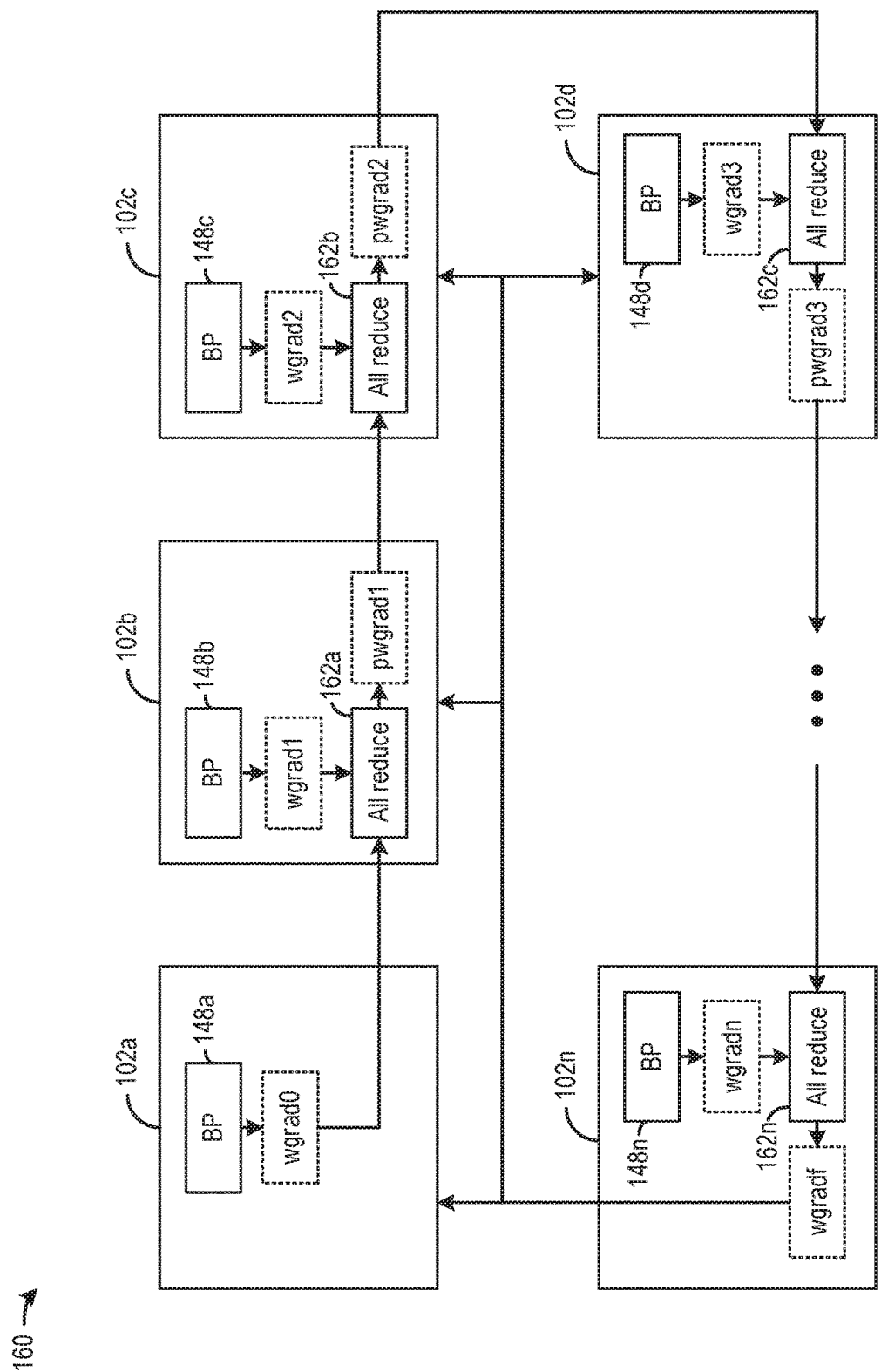

In some examples, the nodes of computing cluster 100 can be arranged/operated in a ring topology to perform weight gradients exchange operations, such as weight gradients exchange operations 150a-150h of FIG. 1D. FIG. 1E illustrates an example ring topology 160, comprising nodes 102a, 102b, 102c, 102d, and 102n of computing cluster 100. As shown in FIG. 1E, each node in the ring topology 160 can perform a backward propagation operation 148 of FIG. 1D to generate a local weight gradient. For example, node 102a can perform backward propagation operation 148a to generate a set of local weight gradients wgrad0, node 102b can perform backward propagation operation 148b to generate a set of local weight gradients wgrad1, and node 102c can perform backward propagation operation 148c to generate a set of local weight gradients wgrad2, whereas node 102n can perform backward propagation operation 148n to generate a set of local weight gradients wgradn. Each backward propagation operation can be performed in parallel based on the input data gradients from a forward propagation operation (not shown in FIG. 1E), which is in turn performed on a portion of training data as shown in FIG. 1D.

After a local weight gradient is generated at a node, the set of local weight gradients can be combined in an all-reduce operation to generate a set of final weight gradients. In one example, the all-reduce operation can include averaging the sets of local weight gradients from each node to generate a set of final weight gradients. The all-reduce operation can be performed sequentially across ring topology 160 as part of exchange operation 150. For example, after node 102a generates local weight gradients wgrad0, node 102a can transmit wgrad0 to the next node in ring topology 160, which is node 102b. Node 102b also generates local weight gradients wgrad1. Node 102b can perform an all-reduce operation 162a on local weight gradients wgrad0 and wgrad1 to generate partial averaged weight gradients pwgrad1. Node 102b can then propagate partial averaged weight gradients pwgrad1 to node 102c. Node 102c also generates local weight gradients wgrad2. Node 102c can perform an all-reduce operation 162b on local weight gradients wgrad2 and partial averaged weight gradients pwgrad1 to generate partial averaged weight gradients pwgrad2. Partial averaged weight gradients pwgrad2 are then propagated to node 102d, which updates weight gradients pwgrad3 by an all-reduce operation 162c. The partial averaged weight gradients are then propagated and updated through additional nodes along ring topology 160 until reaching the final node of the ring topology, node 102n. At node 102n, an all-reduce operation 162n can be performed to combine the set of local weight gradients wgradn with the partial averaged weight gradients received from a preceding node to generate the set of final weight gradients wgradf. Node 102n can then transmit the set of final weight gradients wgradf to other nodes (102a, 102b, 102c, 102d, etc.) of ring topology 160.

In FIG. 1D and FIG. 1E, if each exchange operation takes a long time due to the latency incurred in transferring weight gradients, the total time required for each batch of training operation 140a will increase, which can diminish the performance improvements in distributing the training operation over computing cluster 100. Several operations may be major contributors to latency, including overhead caused by executing network protocol code within the operating system, context switches required to move in and out of kernel mode and to send out data, etc. For example, a typical network protocol stack may cause a roundtrip latency of approximately 100 microseconds, assuming a non-congested, near-zero-delay network. This delay, however, may more typically be compounded with millisecond-long spikes due to scheduling delays, tens of millisecond-long spikes when an application is not designed to avoid network stack issues, and/or seconds-long delays when packets are dropped on a congested link. Computing clusters may be designed with high-bandwidth hardware, and high-bandwidth hardware is typically more sensitive to processor and memory copying overhead.

Virtual Interface (VI) Architecture (VIA) server messaging protocols were developed to provide high-bandwidth, low-latency links between nodes in a computing cluster. Examples of protocols similar to VIA include InfiniBand, Internet Wide Area RDMA Protocol (iWARP), and RDMA over Converged Ethernet (RoCE). Each of these protocols includes a kernel bypass framework, often referred to as RDMA. iWARP provides a kernel bypass framework over the transmission control protocol/Internet protocol (TCP/IP) protocol. RoCE provides a kernel bypass framework over Ethernet-type networks. InfiniBand provides a kernel bypass framework over an InfiniBand-specific network. Sometimes the terms "InfiniBand" and "RDMA" are used interchangeably, though other protocols (such as iWARP and RoCE) also provide an RDMA-style, kernel bypass framework. RDMA-based devices may also allow multiple applications to directly access the hardware without interfering with each other. RDMA devices may rely on a kernel only for control operations, to perform initialization, and for some coordination that may be required for interrupt handling; but otherwise, an RDMA device may operate independently of the kernel. This means that a processor need not be involved in RDMA operations. RDMA frameworks may also provide optimizations such as polling-mode completion handling, which may be beneficial for providing ultra-low latency.

RDMA can include an extension of DMA. DMA typically allows certain hardware subsystems to access main system memory without using a processor. Similarly, RDMA allows one computer to access memory on another computer over a network, without involving a processor in either computer. Hence, a local computer may be able to perform reads, writes, or atomic operations on a remote computer's memory without intermediate copies being made by a processor at either the local or the remote computer. In many implementations, RDMA is made possible by the local computer and the remote computer each having an RDMA adapter.

Figure 2A:
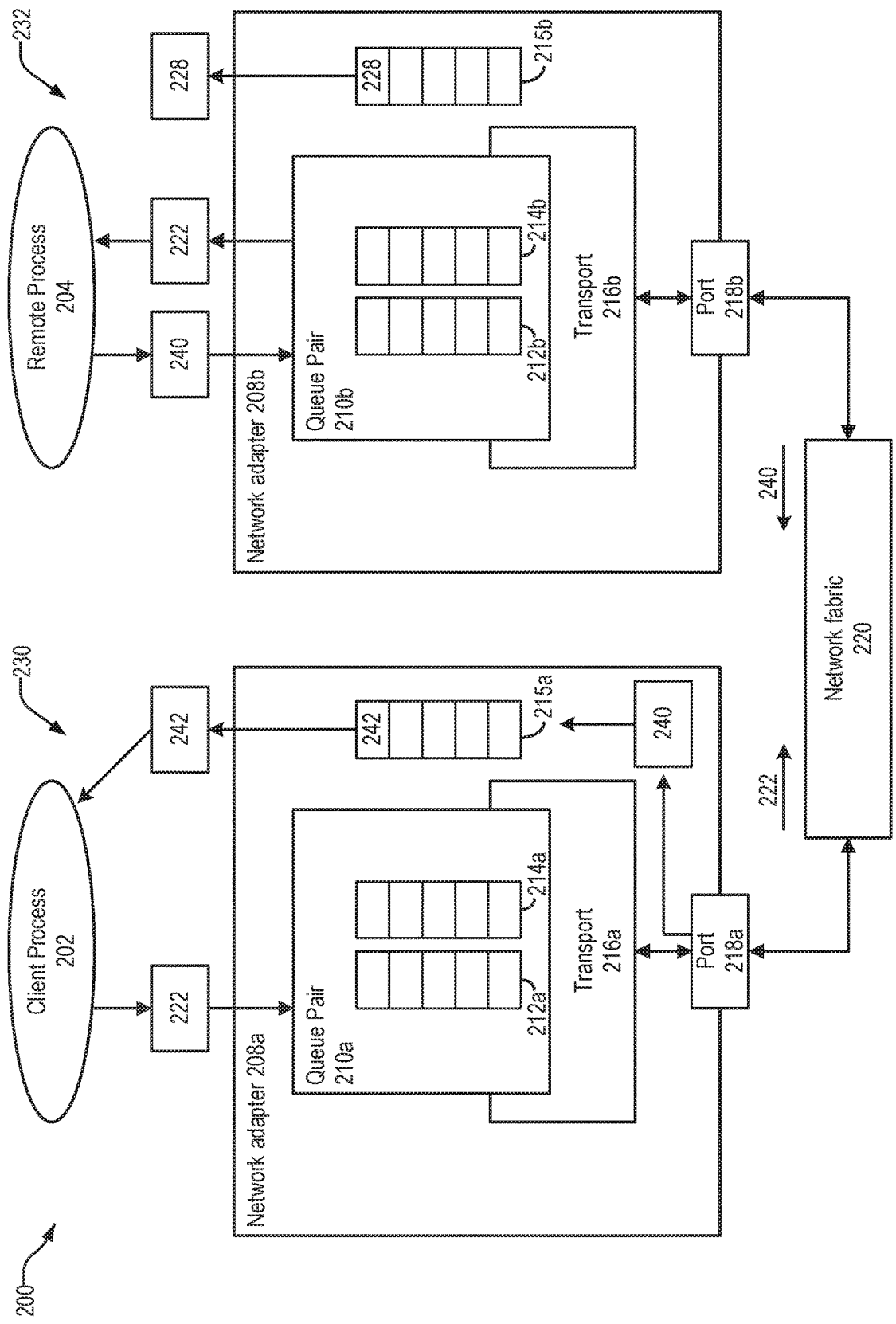
FIG. 2A and FIG. 2B illustrate an example of a communication stack that can use techniques of the present disclosure.

FIG. 2A illustrates an example of a communication stack 200 that may be used to implement a kernel bypass framework in cluster 100. Using communication stack 200, such as is illustrated in FIG. 2A, a client process 202 may be able to communicate directly with a remote process 204 on a remote system 232, without help from a processor at either the local system 230 or the remote system 232. The example of FIG. 2 illustrates, as an example, a communication stack 200 between two processes executing on two different systems. As will be explained below, a similar communication stack can be configured between any two processes communicating across a network fabric 220, which can be an InfiniBand-specific network. Also, while one system 230 is called "local" and the other system 232 is called "remote," it is understood that in some implementations the communication stack 200 can also operate in the reverse direction, such that the remote system 232 can originate messages directed at the local system 230.

In some implementations, the communication stack 200 illustrated in FIG. 2A operates with minimal use of a processor at either the local 230 or the remote 232 system. Removing or reducing network traffic control duties from processors may be accomplished through work queues, also called "work queue pairs" or simply "queue pairs" 210a-b. Queue pairs 210a-b can be implemented at the local memory of each network adapter (not shown in FIG. 2). For each communication channel between the local system 230 and the remote system 232, a queue pair 210a-b may be assigned at both systems 230 and 232. A queue pair 210a-b includes an SQ 212a-b to manage processing of traffic headed for the network fabric 220, and an RQ 214a-b to manage processing of traffic coming in from the network fabric 220. In some implementations, the client process 202 initiates a queue pair 210a-b when establishing a communication channel with the remote process 204. In these implementations, the client process 202 can initiate additional work queues for communicating with the same remote process 204, with different processes running on the same remote system 232, or with processes running on other remote systems. Client processes and remote processes include non-kernel or operating system processes, such as user applications and/or driver programs.

In some implementations, the queue pair 210a at the local system 230 resides on a network adapter 208a. Network adapter 208a may be configured to communicate with the network fabric 220. Network adapter 208a may include additional queue pairs that are assigned to other processes, to the same client process 202, or that may currently be unused. Queue pair 210a may be implemented in hardware, in software (for example in a driver), or in a combination of hardware and software. In addition to queue pair 210a, network adapter 208a further includes a CQ 215a, which can be implemented in the local memory of network adapter 208a, to track the status of processing of the traffic managed by queue pair 210a. In addition, network adapter 208a may also include a transport layer 216a, which manages communication with the network fabric 220 and remote process 204. Network adapter 208a may also include a physical port 218a, connecting network adapter 208a to fabric 220.

The client process 202 may initiate a transaction to the remote process 204 by placing a WQE into the local SQ 212a. In the example of FIG. 2A, the WQE can represent/include a message 222 to be sent from client process 202 to remote process 204. The WQE may represent a transaction, such as a read, a write, or an atomic transaction of data. In some implementations, the WQE may also include information identifying the remote process 204 as the target of the transaction. Remote process 204 can then send a notification (e.g., a doorbell interrupt signal) to network adapter 208a. Upon receiving the doorbell interrupt signal, network adapter 208a may process the WQE directly from SQ 212a. Network adapter 208a may generate one or more packets representing message 222 using the information in the WQE. The transport layer 216a may transmit these one or more packets through the port 218a to the network fabric 220.

The remote system 232 may receive the packet or packets from the network fabric 220 at a network adapter 208b. Like network adapter 208a, network adapter 208b includes a port 218b connecting network adapter 208b to the network fabric 220. Network adapter 208b may also include a transport layer 216b, which manages communication with the network fabric 220 and the client process 202. Network adapter 208b may also include a queue pair 210b that is assigned to the remote process 204.

The packet or packets received at the remote system 232 from the network fabric 220 may be directed by the transport layer 216b to an RQ 214b. In some implementations, network adapter 208b may reassemble message 222 generated by the client process 202 and place a WQE into RQ 214b representing/including message 222. Network adapter 208b may pop the WQE from RQ 214b and send message 222 to remote process 204. In addition, a CQE 228 can be stored in a CQ 215b, which can be implemented in the local memory of network adapter 208b to provide an indication that message 222 has been transferred to remote process 204, and that remote process 204 can start operating on message 222. After operating on message 222, remote process 204 can generate a response 240 that is to be returned to the client process 202. The remote process 204 may place a WQE, containing/representing the response, in its own SQ 212b. The response may then traverse the fabric 220 back to the local system 230, where it is stored in CQ 215a as a CQE 242. CQE 242 can also be sent to client process 202 to indicate that the transmission of message 222 completes.

As part of the processing of WQEs at SQ 212 and at RQ 214, network adapter 208 may perform a DMA operation to fetch or write data into a memory. For example, to process a WQE at SQ 212, network adapter 208 may fetch data from the memory via a DMA operation to generate packets for transmission to network fabric 220. Moreover, to process a WQE at RQ 214, network adapter 208 may extract data from the received packets and write the received data via a DMA operation into the memory.

Figure 2B:
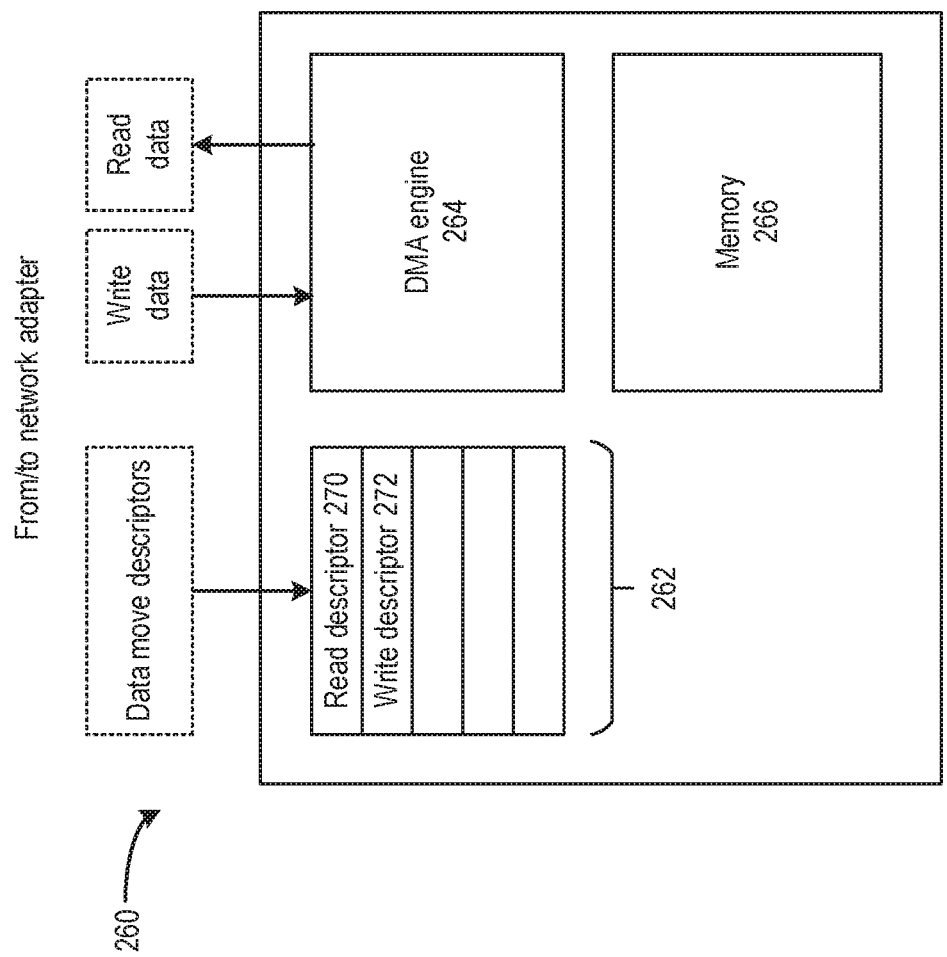

FIG. 2B illustrates an example of a memory system 260 that supports a DMA operation. As shown in FIG. 2B, memory system 260 includes an access queue 262, a DMA engine 264, and a memory 266. Access queue 262 can store DMA descriptors, such as a read descriptor 270 and a write descriptor 272, each specifying a memory access operation (read/write), as well as the source and the destination of the memory access operation. In some examples, access queue 262 may include a read access queue to store read descriptors and a write access queue to store write descriptors. Memory system 260 can support the RDMA operations over a network as shown in FIG. 2A, as well as DMA operations over interconnects (e.g., a PCIe root-complex, a peer-to-peer PCIe link).

To fetch data from memory system 260, a network adapter (e.g., network adapter 208a, network adapter 208b) can transmit data move descriptors, such as a read descriptor 270, to memory system 260. Read descriptor 270 can include various information including, for example, a source address of memory 266 that stores the data to be fetched, as well as a destination address of a local memory of the network adapter to receive the fetched data. Read descriptor 270 can be stored in access queue 262. Upon detecting that read descriptor 270 is stored in access queue 262, DMA engine 264 can fetch read descriptor 270 from access queue 262 and perform a read operation at memory 266 to fetch the requested data (labeled "read data" in FIG. 2B). DMA engine 264 can then transmit the requested data, as well as memory write requests including the destination of the requested data, to the network adapter. Upon receiving the requested data and the memory write requests, the memory controller of the network adapter can write the requested data at the local memory of the network adapter based on the memory write requests. Later, the network adapter can fetch the requested data from its local memory to generate packets. On the other hand, to write data into memory 266, the network adapter can transmit data move descriptors, such as a write descriptor 272 as well as the data to be written into the memory (labeled "write data" in FIG. 2B), to memory system 260. The write descriptor can be stored at access queue 262. DMA engine 264 can fetch write descriptor 272 from access queue 262 and execute the write descriptor by writing the received data into memory 266.

In the example communication stack 200 of FIG. 2A, the involvement of operating system kernel at both local system 230 and remote system 232 in transferring of messages 222 and response 240 are at a minimum. For example, client process 202 can send message 222 to network adapter 208a directly without involvement of the operating system kernel of local system 230. Likewise, remote 204 can receive message 222 directly from network adapter 208b without involvement of the operating system kernel of local system 232. Moreover, the fetching and the storing of data at the memory are performed via DMA operations without involvement of the operating system kernel of local system 230. As a result, the latency incurred delivering message 222 between client process 202 and remote process 204 can be reduced.

The kernel bypass framework, provided by communication stack 200, can also be implemented in a computing system having dedicated computing resources to support certain data processing applications, such as a neural network hardware accelerator to support neural network computations. In such a computing system, the dedicated computing resource can directly receive packets from the network adapter with minimum (or no) involvement from the operating system kernel, which can speed up the data processing application supported by the computing resource.

Figure 3A:
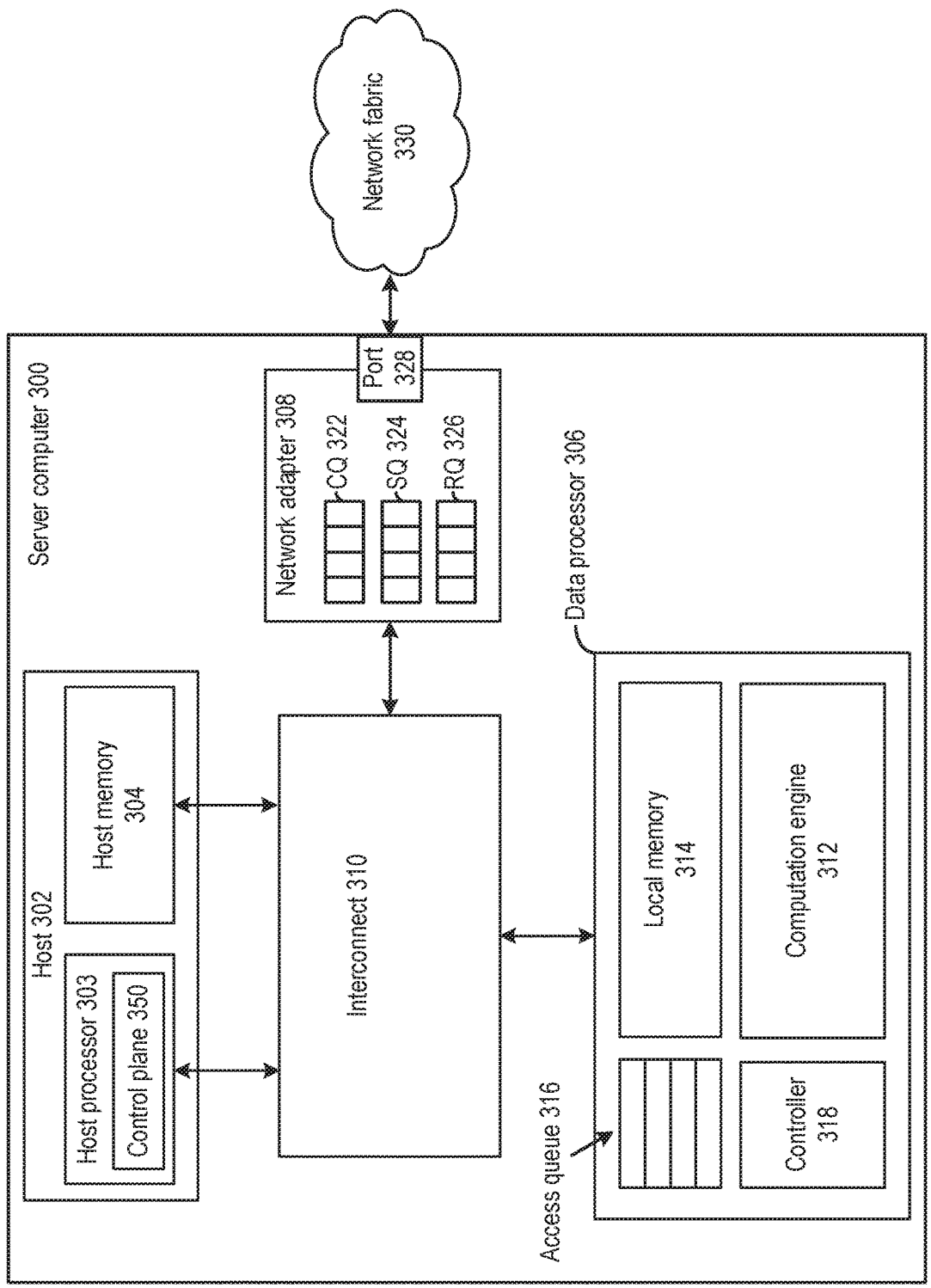
FIG. 3A and FIG. 3B illustrate examples of a computing server that can use techniques of the present disclosure.
Figure 3B:
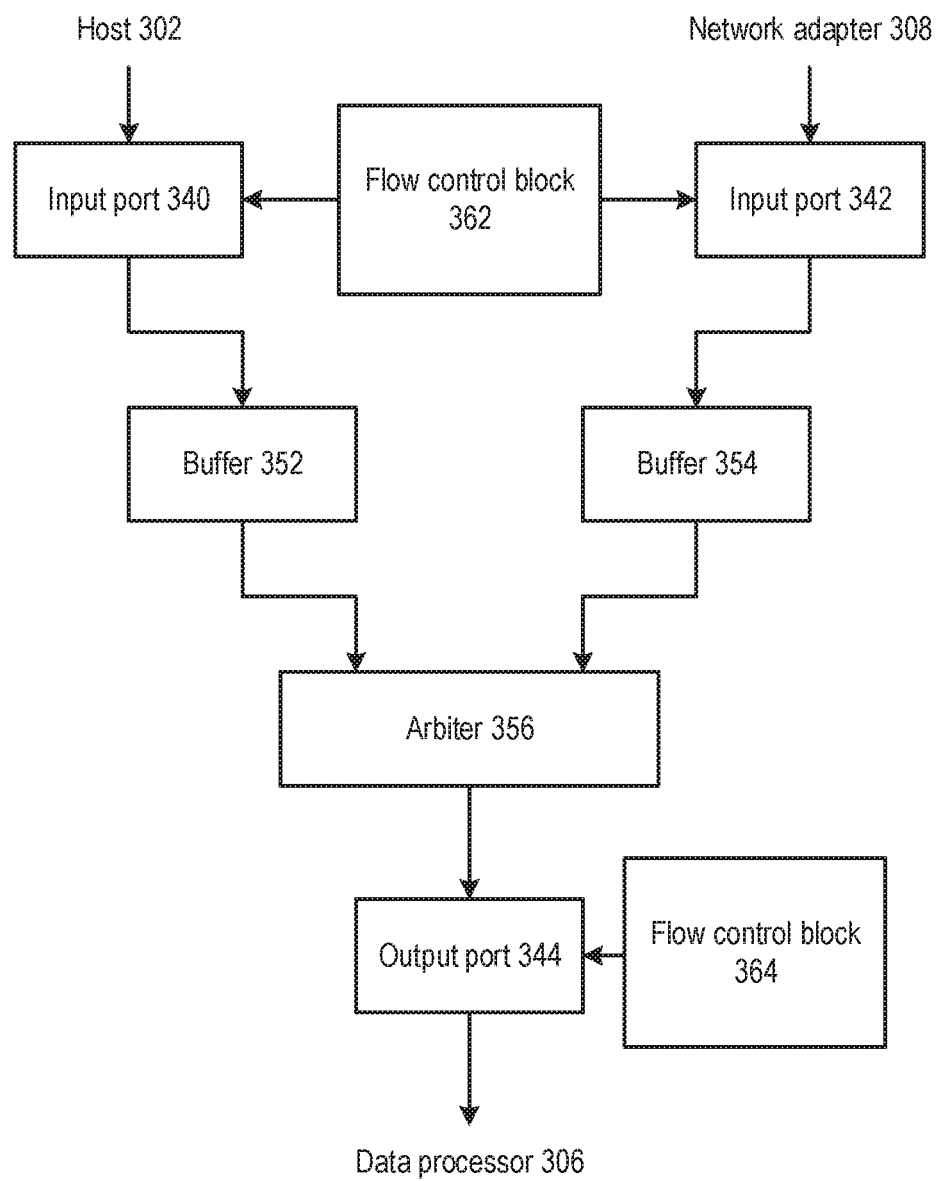

FIG. 3A and FIG. 3B illustrate an example of a server computer 300 that can implement communication stack 200. Referring to FIG. 3A, server computer 300 includes a host 302, which includes a host processor 303 and a host memory 304, a hardware data processor 306, and a network adapter 308. Host processor 303, host memory 304, hardware data processor 306, and network adapter 308 can be interconnected via an interconnect 310, such as a PCIe interconnect implemented as a root complex switch. Server computer 300 can implement any one of nodes 102a-h of FIG. 1A, where multiple server computers 300 can be interconnected to form computing cluster 100 of FIG. 1A.

Hardware data processor 306 can include a computing engine 312 to provide dedicated computing resources to support certain data processing applications. In some examples, computing engine 312 may include a neural network hardware accelerator. Hardware data processor 306 also includes a local memory 314 to support computing engine 312. Local memory 314 can be accessible to network adapter 308 and host 302 via, for example, a DMA engine (not shown in the figures). Local memory 314 can include an on-chip or an off-chip memory, such as static random access memory (SRAM), dynamic random access memory (DRAM), high-bandwidth memory (HBM), and non-volatile memory such as storage class memory (SCM) and flash memory. In addition, hardware data processor 306 also includes one or more memory access queues 316 to store read and write requests to local memory 314. Each request can include a DMA descriptor (e.g., a read DMA descriptor, a write DMA descriptor) to be executed by a DMA engine (not shown in FIG. 3A) to perform a data transfer between local memory 314 and each of network adapter 308 and host 302. Hardware data processor 306 further includes a controller 318 to manage the operations of computation engine 312, local memory 314, and access queue 316. For example, controller 318 can fetch and execute the read/write DMA descriptors from access queue 316, control the time when computation engine 312 fetches or stores data at local memory 314, and so on. Controller 318 can also communicate with each of host 302 and network adapter 308, and manage the operations of computation engine 312, local memory 314, and access queue 316 based on the communication.

Host processor 303 of host 302 can execute an operating system kernel as well as other applications that use the computation resources provided by hardware data processor 306. For example, host processor 303 can execute a training application that controls hardware data processor 306 to perform batches of distributed training operation 140. As another example, host processor 303 can execute an image recognition application that uses hardware data processor 306 to perform an inferencing operation using a neural network with weights obtained from distributed training operation 140. In addition, host memory 304 provides memory resources to support the operation of host processor 303 as well as hardware data processor 306. For example, host memory 304 can store the input training data, the input data for the inference operation, etc., and supply the data to hardware data processor 306 via, for example, DMA operations. Host memory 304 can include an on-chip or an off-chip memory, such as SRAM, DRAM, HBM, and non-volatile memory such as storage class SCM and flash memory.

Network adapter 308 can include similar components of network adapter 208a/b of FIG. 2 to implement communication stack 200. Specifically, network adapter 308 can include a physical port 328 that connects network adapter 308 to network fabric 330, from which network adapter 308 can receive packets. Network adapter 308 further includes a CQ 322, an SQ 324, and an RQ 326, which can operate the same way as CQs 215, SQs 212, and RQs 214 of FIG. 2. For example, when network adapter 308 receives a set of packets for a transaction from network fabric 330, network adapter 308 can store a WQE including/representing the message data of the transaction, which are extracted from the packets, in RQ 326. In a case where the message data are targeted at hardware data processor 306 (e.g., weight gradients from other worker nodes), network adapter 308 can then send a set of write descriptors, as well as the message data, to hardware data processor 306 via interconnect 310. Hardware data processor 306 can then buffer the write descriptors in access queue 316 and execute the write descriptors to write the message data into local memory 314. For a transaction to send data (e.g., weight gradients) out of hardware data processor 306, a WQE can also be posted in SQ 324, for which network adapter 308 transmits read descriptors to hardware data processor 306 to fetch the data from local memory 314. Network adapter 308 can then assemble packets from the fetched data and send the packets via port 328 to network fabric 330. As network adapter 308 transmits the packet data directly to hardware data processor 306 to perform the computations, without the packet data being processed by host 302, the latency in delivering the data to hardware data processor 306 can be reduced.

In addition, after network adapter 308 completes the transmission of the write requests to hardware data processor 306, network adapter 308 can store a transfer complete message, such as a CQE, in CQ 322. The transfer complete message can indicate that network adapter has initiated the transfer of data to hardware data processor via the interconnect. The CQE can also indicate that a transfer of data for the transaction has been completed from the perspective of the network adapter. The CQE can also include other information, such as a status of reception/transmission of packets (e.g., whether there are missing packets, whether the packets contain data error). In some examples, network adapter 308 can also store the CQE at host memory 304 (e.g., via a DMA operation), to notify the application executing at host processor 303 that the transaction has been completed and the data has been transferred to hardware data processor 306. The notification allows the host processor 303 to instruct hardware data processor 306 either to start the processing of the data or not to process the data. For example, in a case of a training operation, host processor 303 can instruct hardware data processor 306 to start updating the weights based on the weight gradients received from network adapter 308. In a case where the CQE indicates missing or corrupted data, the host processor can also control hardware data processor 306 to not perform the computation operation on the data.

In some examples, CQ 322, as well as SQ 324 and RQ 326, can be address mapped to, respectively, host memory 304 and local memory 314. Specifically, each of CQ 322, SQ 324, and RQ 326 can be implemented at a local memory of network adapter 308 (not shown in FIG. 3A) and each can be associated with a base address. The base address of CQ 322 can be mapped to a base address of a region of host memory 304 allocated to receive CQE, whereas the base addresses of SQ 324 and RQ 326 can be mapped to a base address of a region of local memory 314 allocated to handle the read/write requests. In a case where interconnect 310 is based on the PCIe specification, the base addresses of host memory 304 and local memory 314 can be stored in base address registers (BARs) and mapped to the base addresses of the queues. In some examples, SQ 324 and RQ 326 can also be mapped to host memory 304, in a case where host 302 controls the sending and reception of packets at network adapter 308.

FIG. 3B illustrates an example of internal components of interconnect 310 which can be implemented as a root-complex switch. As described above, interconnect 310 can provide connectivity among host 302, network adapter 308, and hardware data processor 306. As shown in FIG. 3B, interconnect 310 includes multiple ports, such as, for example, an input port 340, an input port 342, and an output port 344. Input port 340 can be connected to host 302, and input port 342 can be connected to network adapter 308, whereas output port 344 can be connected to hardware data processor 306. Arbiter 356 can select, based on any arbitration algorithm (e.g., a round-robin scheme), the order by which input ports 340 and 342 forward data to output port 344. Through input ports 342 and 344, arbiter 356, and output port 344, both host 302 and network adapter 308 can transmit data to hardware data processor 306, albeit at different times.

In addition, interconnect 310 includes flow control blocks 362 and 364, as well as buffers 352 and 354 to implement a flow control mechanism. The flow control mechanism may be implemented to, for example, police/shape the volume of communication traffic from host processor 303 and network adapter 308 into hardware data processor 306, to prevent any one of host processor 303 or network adapter 308 from dominating the transmission of data to hardware data processor 306. To support the traffic shaping, flow control block 362 can implement, for example, a credit system to keep track of a volume of data that has flown through each of input port 340 and 342. Flow control block 362 can stop an input port from letting data into interconnect 310 if the input port runs out of the requisite credit to transmit the data. In addition, output port 344 is controlled by flow control block 364. Flow control block 364 can also implement a credit system to limit the rate at which hardware data processor 306 receives data through output port 344. The flow control at output port 344 can be arranged to accommodate, for example, bandwidth/speed limitation of local memory 314 of hardware data processor 306. Buffers 352 and 354 can buffer data received from, respectively, input ports 340 and 342 while the data are gated from output port 344 by flow control block 364 and/or arbiter 356.

Figure 4A:
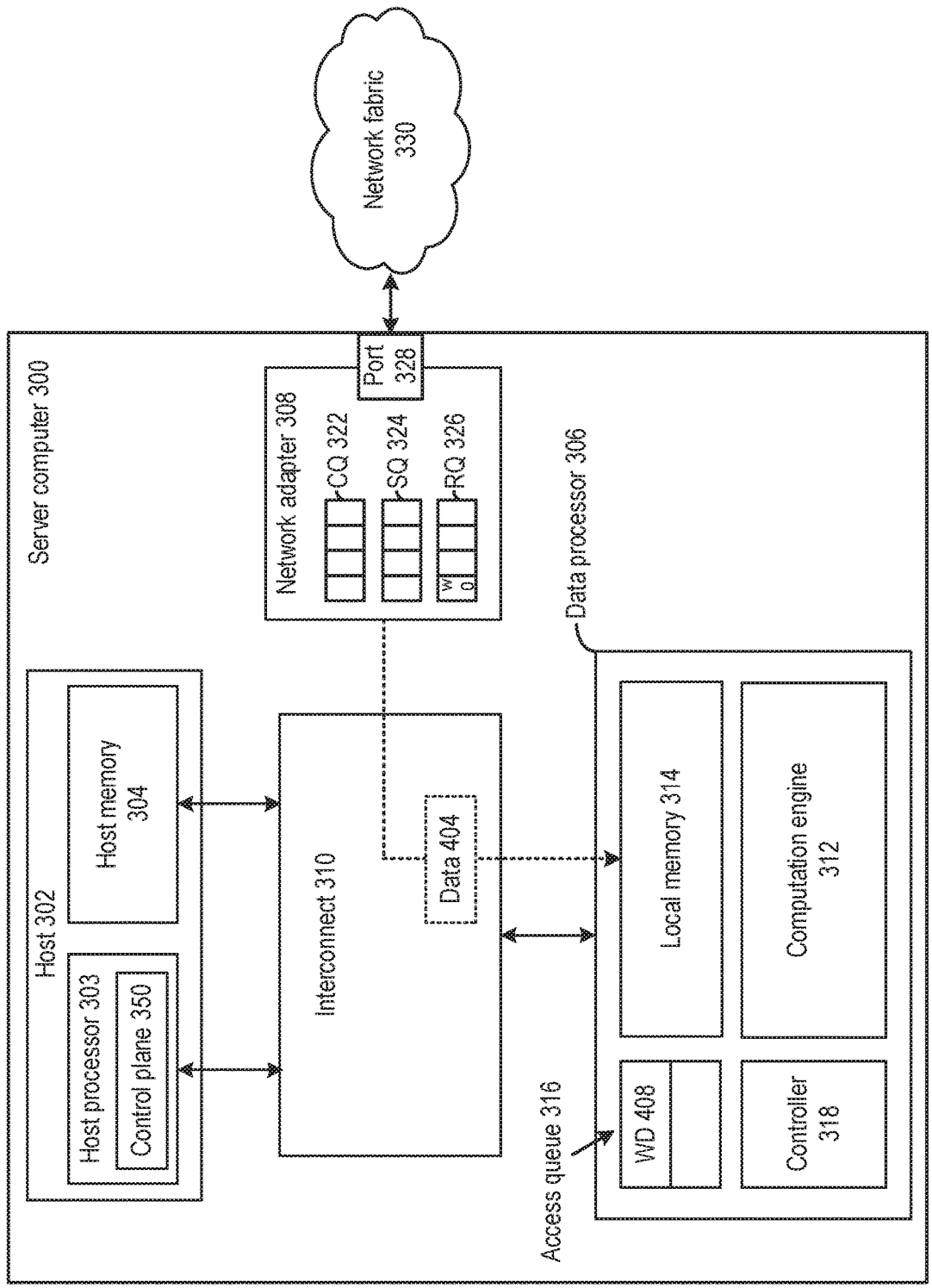
FIG. 4A, FIG. 4B, FIG. 4C, FIG. 4D, FIG. 4E, and FIG. 4F illustrate examples of a sequence of data generation and transfer operations performed by the example computing server of FIG. 3A-FIG. 3B.

Referring back to FIG. 3A, in some examples, host processor 303 may implement a control plane function 350. The control plane function 350 can control the movement of data into and out of hardware data processor 306 via network adapter 308, as well as the generation of data at hardware data processor 306. FIG. 4A-FIG. 4E illustrate an example sequence of operations involved in the transmission and generation of data at hardware data processor 306 when host processor 303 implements the control plane function. Referring to FIG. 4A, when input data 404 (e.g., partial averaged weight gradients) arrives at network adapter 308 from another worker node, a WQE ("w0") can be posted at RQ 326. Network adapter 308 can then generate write descriptors 408 based on a mapping between RQ 326 and local memory 314, and send write descriptors 408 to hardware data processor 306. The DMA engine of hardware data processor 306 can then execute the write descriptors to fetch input data 404 from a local memory of network adapter 308 (not shown in the figures) and store input data 404 at local memory 314 of hardware data processor 306.

Figure 4B:
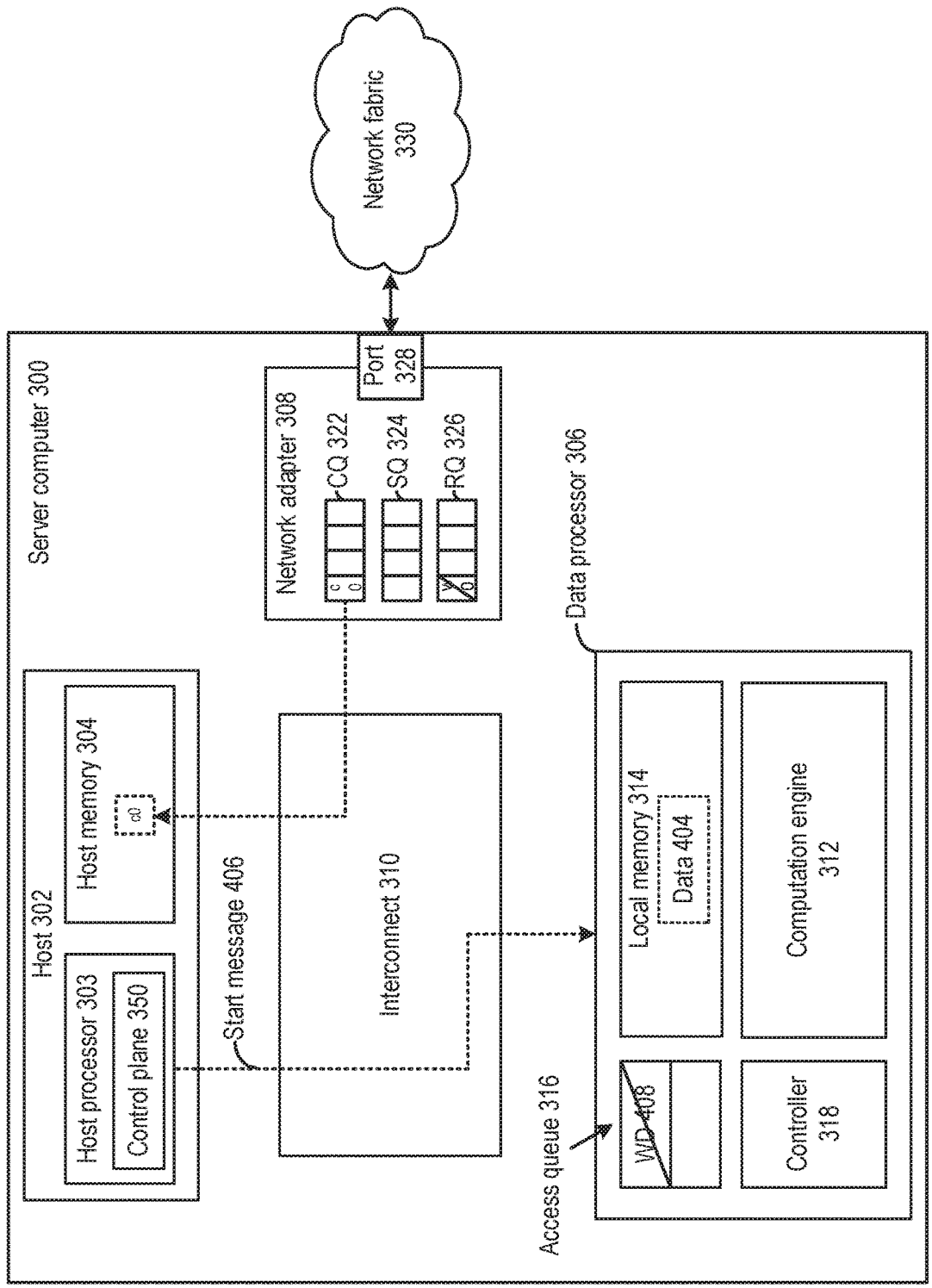

Referring to FIG. 4B, after fetching input data 404 to interconnect 310, network adapter 308 can send a transfer complete message, such as a CQE, to host processor 303. Network adapter 308 can post a CQE ("c0" in FIG. 4B) in the CQ, which can be mapped to host memory 304, to transmit the CQE to host processor 303. Upon receiving the CQE, host processor 303 can send a start message 406 to hardware data processor 306 via interconnect 310.

Figure 4C:
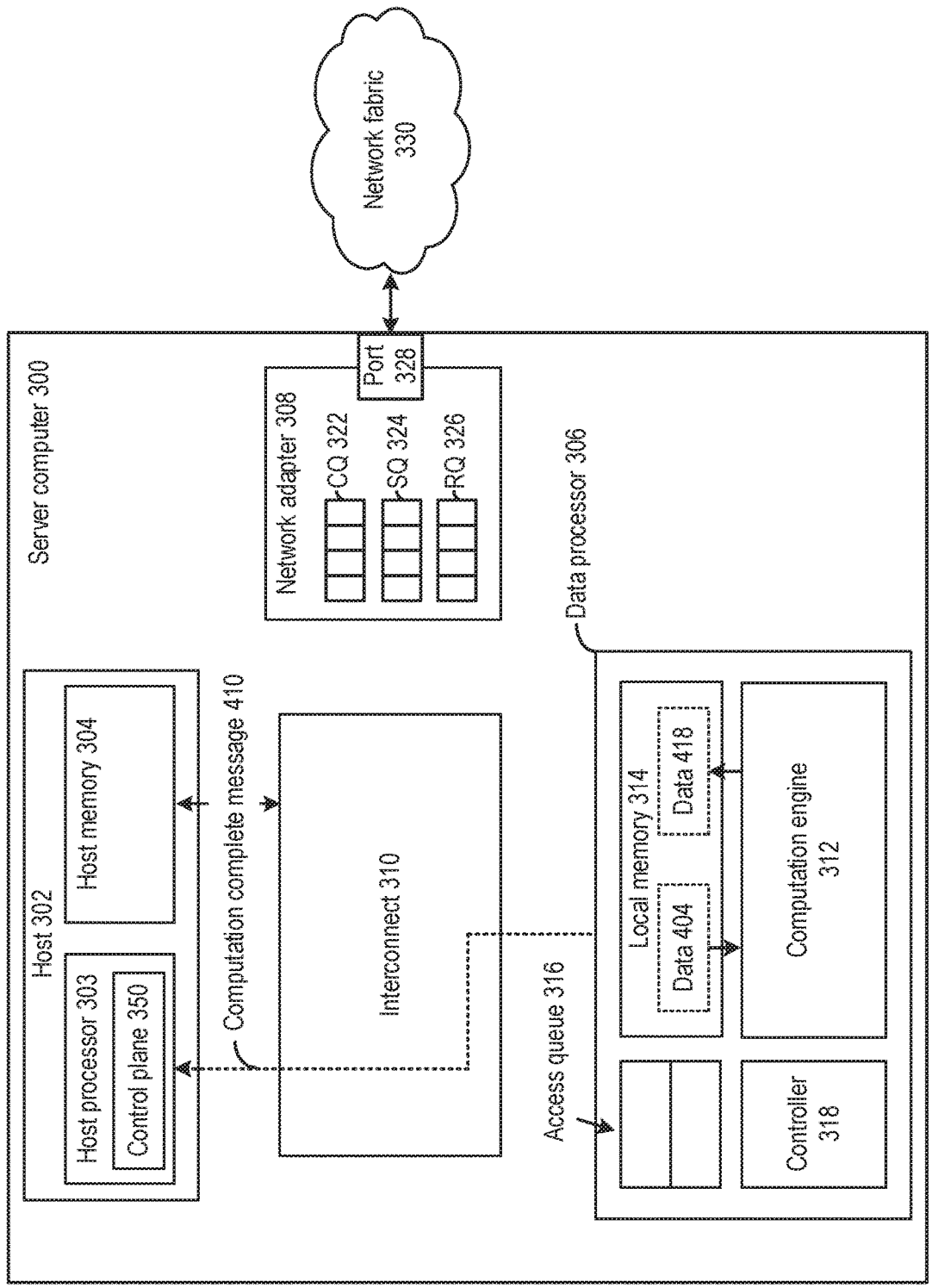

Referring to FIG. 4C, upon receiving start message 406, controller 318 can trigger hardware data processor 306 to perform a computation operation (e.g., a forward/backward propagation operation, an all-reduce operation) on input data 404 to generate output data 418, and store output data 418 back to local memory 314. Upon completion of the computation operation, hardware data processor 306 can send a computation complete message 410 to host processor 303 via interconnect 310.

Figure 4D:
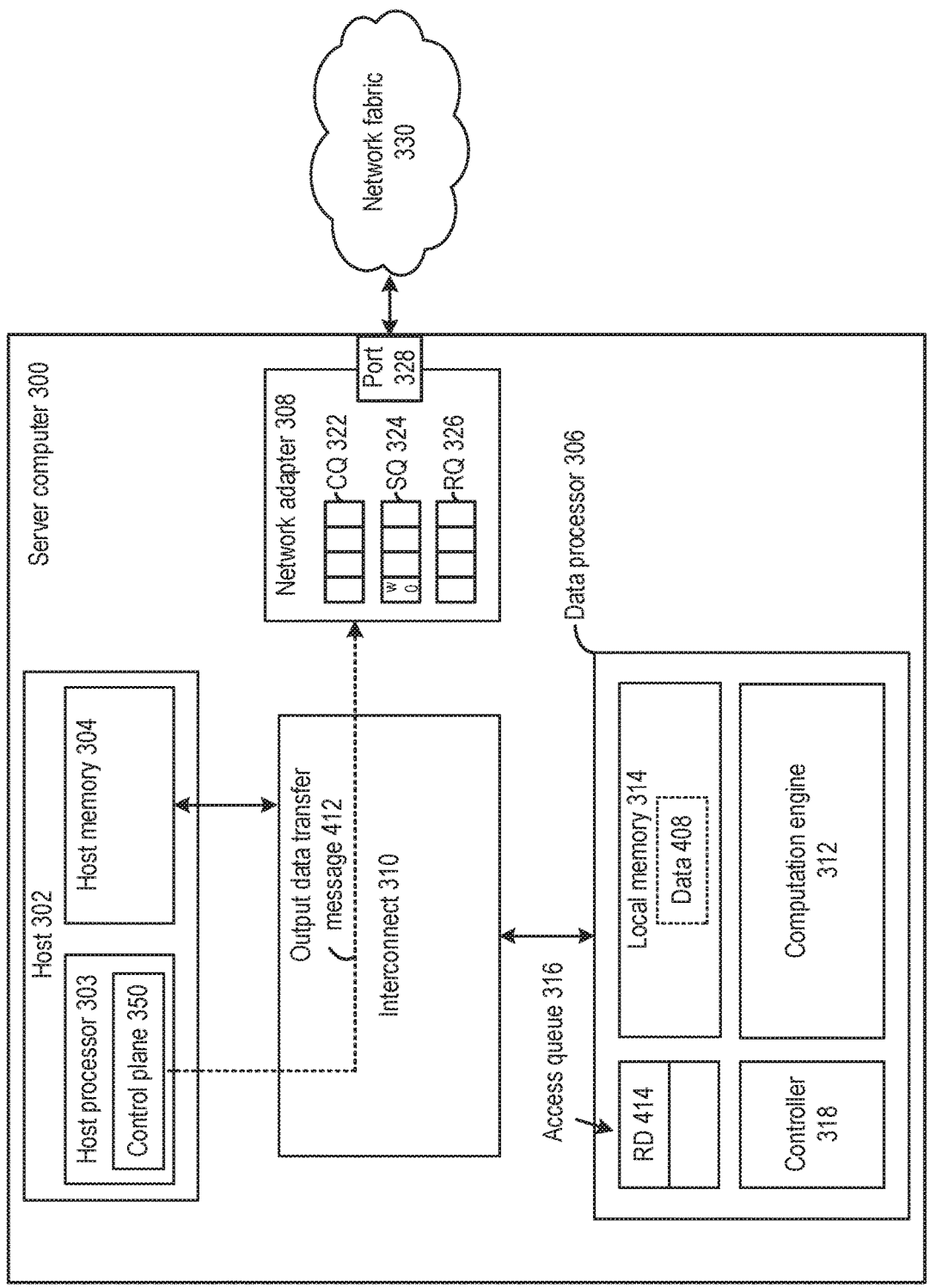

Referring to FIG. 4D, upon receiving computation complete message 410, host processor 303 can post a WQE ("w0") at SQ 324 of network adapter 308 via the mapping of the SQ to host memory 304. Host processor 303 can also transmit an output data transfer message 412, which can be via a doorbell interrupt signal, to network adapter 308. Output data transfer message 412 can trigger network adapter 308 to sending read descriptors 414 to the hardware data processor 306.

Figure 4E:
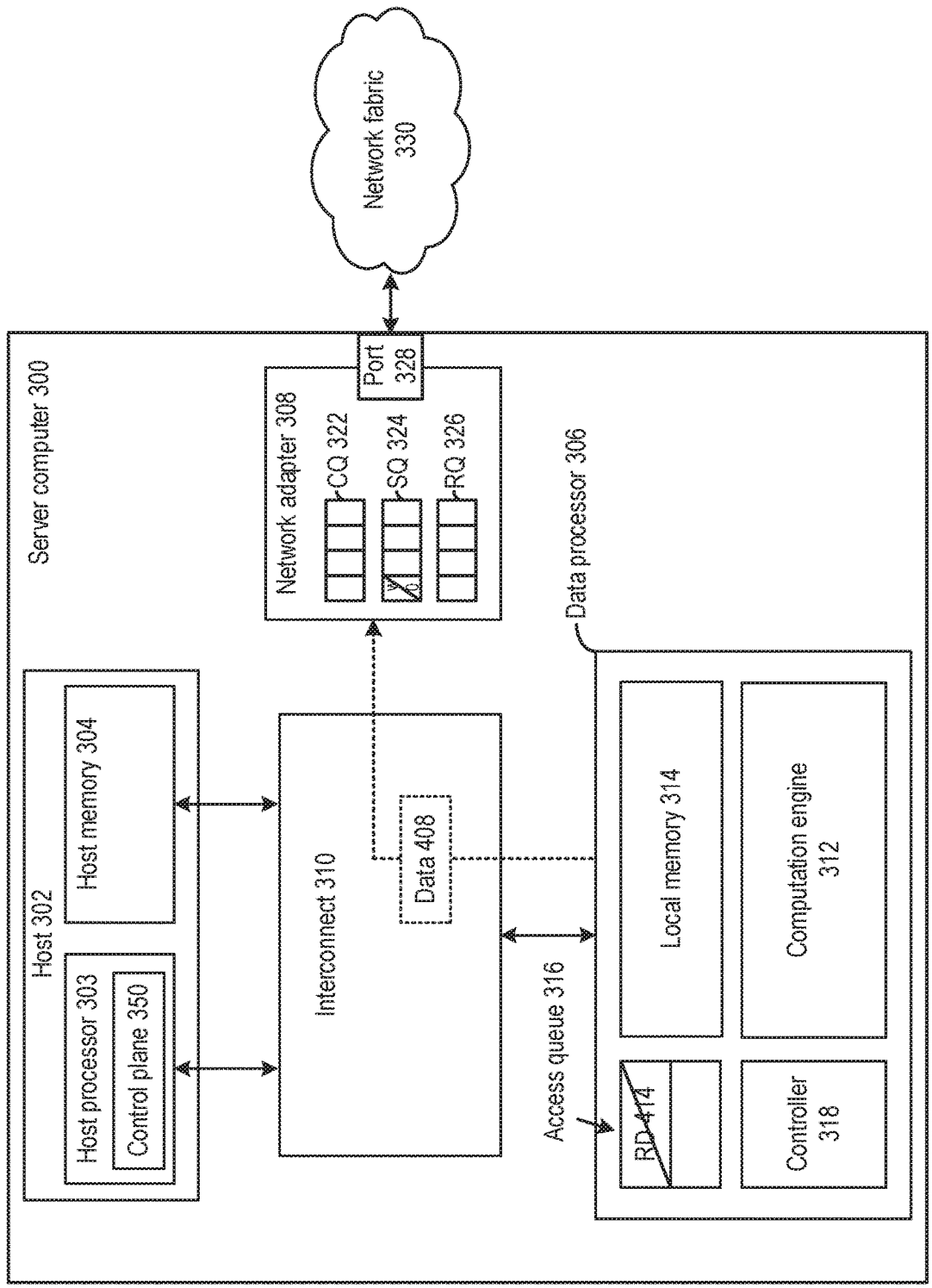

Referring to FIG. 4E, the DMA engine can execute read descriptors 414 and fetch output data 418 to network adapter 308. Network adapter 308 can then generate packets including the output data, and transmit the packets to the network.

Implementing the control plane function at host processor 303 can introduce substantial latency to the data generation and data movement operations at server computer 300. Specifically, the communication among the host processor, the hardware data processor, and the network adapter via the interconnect to support the control plane function can delay the start of the generation of data at the hardware data processor and the transmission of the data from the hardware data processor to the network adapter, all of which can add latency to the distributed computation operation.

Figure 4F:
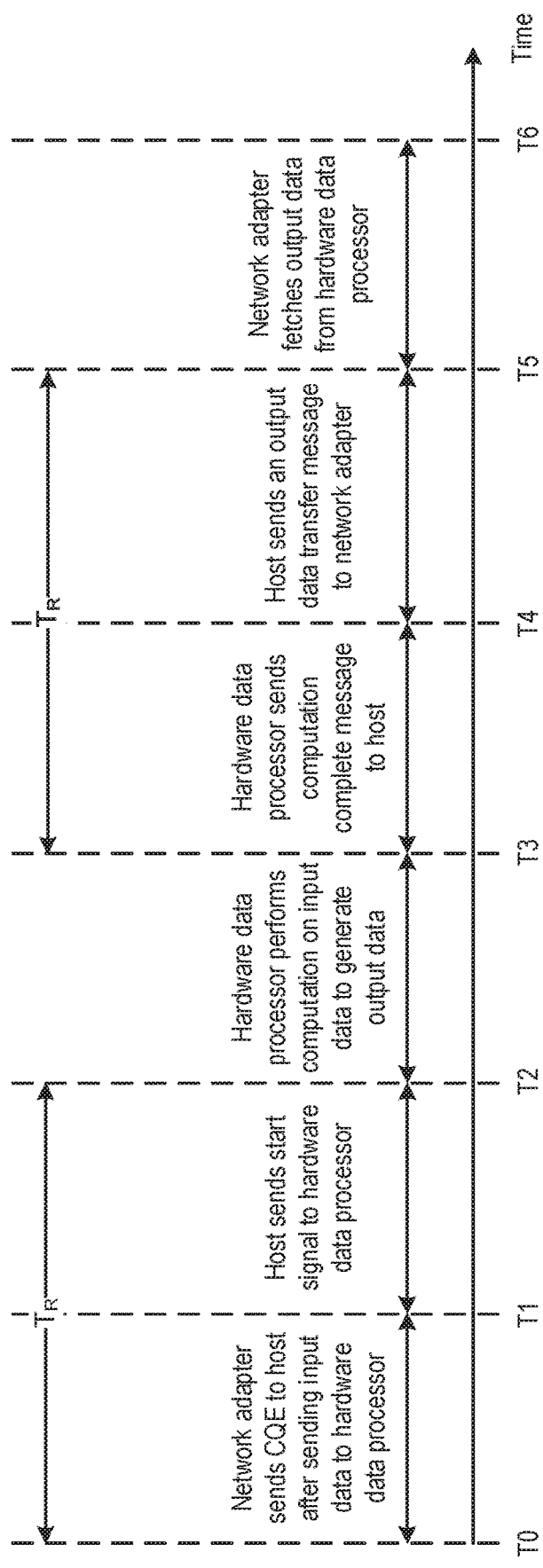

FIG. 4F illustrates an example timing diagram 420 of the sequence of operations in FIG. 4A-FIG. 4E. As shown in FIG. 4F, hardware data processor 306 starts the computation on input data 404 at time T2 after network adapter 308 sends CQE to host 302 between times T0 and T1, and host 302 sends start message 406 to hardware data processor 306 between times T1 and T2, with times T0-T2 spanning a delay $T_R$. Therefore, the start of computation at hardware data processor 306 has been delayed by $T_R$. Moreover, network adapter 308 fetches output data 418 from hardware data processor 306 at time T5 after hardware data processor 306 sends computation complete message 410 to host 302 between times T3 and T4, and host 302 sends output data transfer message 412 to network adapter 308 between times T4 and T5, with times T3-T5 also spanning a delay $T_R$. Therefore, the fetching of output data 418 to network adapter 308 has also been delayed from the time when output data 418 is generated (at time T3) by the delay $T_R$. The delay $T_R$ can be attributed to, for example, a roundtrip delay between hardware data processor 306 and each of network adapter 308 and host 302 over interconnect 310 (e.g., caused by flow control blocks, arbiter), as well as the execution delay at host processor 303, and can be in the range of microseconds. The delay can substantially increase the overall time of the computation operations at the hardware data processor, especially in a distributed training operation where a worker node needs to exchange weight gradients with each of other worker nodes in multiple transactions over the network. The overall performance of the distributed computing system can become degraded as a result.

In some examples, to reduce the delay introduced by host 302, controller 318 of hardware data processor 306 can implement the control plane function. FIG. 5A-FIG. 5E illustrate an example sequence of operations involved in the transmission and generation of data at hardware data processor 306 when controller 318 of hardware data processor 306 implements control plane function 502 to control the movement of data into and out of hardware data processor 306 via network adapter 308, as well as the generation of data at hardware data processor 306.

Figure 5A:
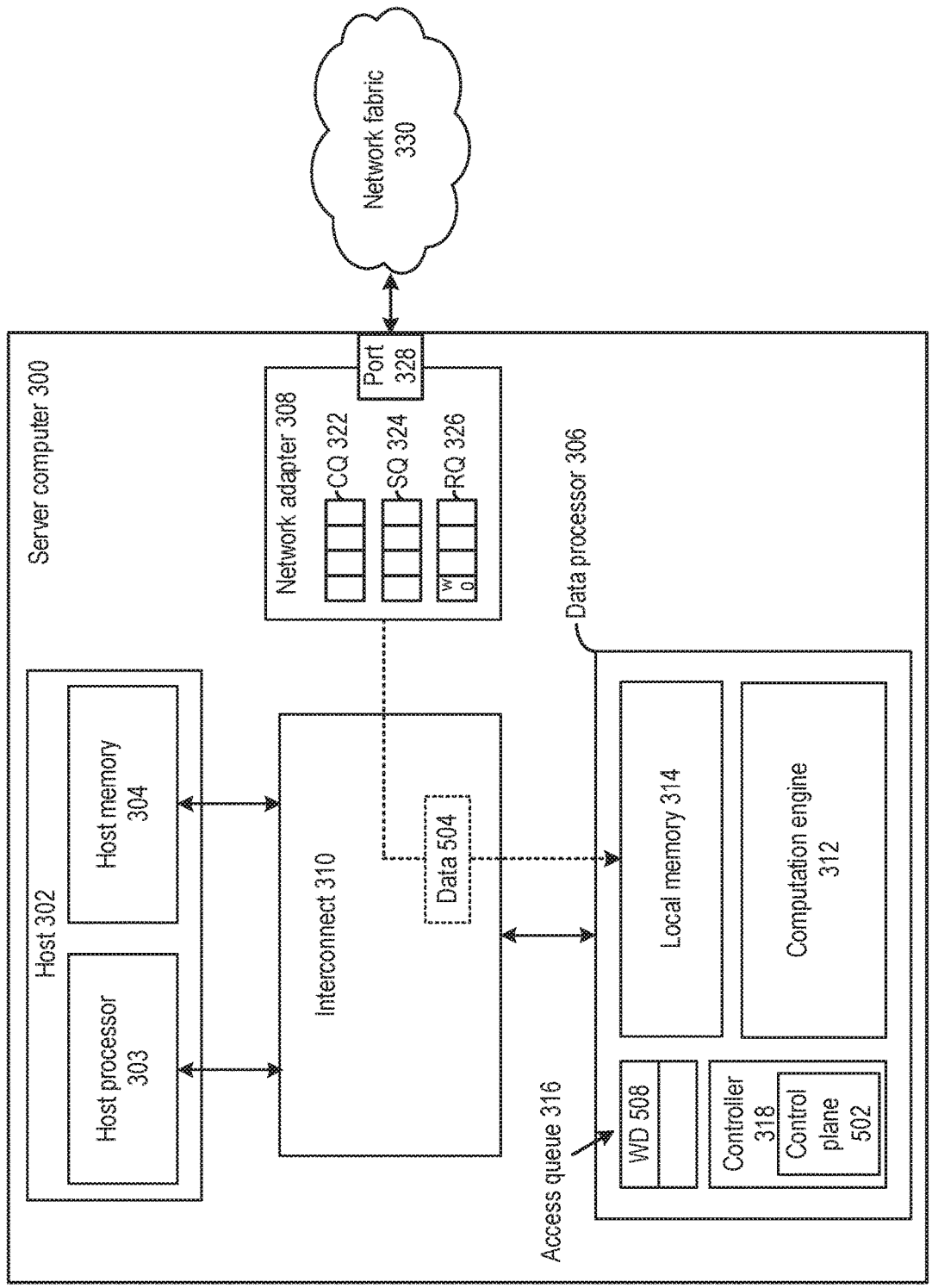
FIG. 5A, FIG. 5B, FIG. 5C, FIG. 5D, FIG. 5E, and FIG. 5F illustrate other examples of a sequence of data generation and transfer operations performed by the example computing server of FIG. 3A-FIG. 3B.

Referring to FIG. 5A, when input data 504 (e.g., partial averaged weight gradients) arrives at network adapter 308 from a second worker node, a first WQE ("w0") can be posted at RQ 326. Network adapter 308 can then generate write descriptors 508 based on a mapping between RQ 326 and local memory 314, and send write descriptors 508 to hardware data processor 306. The DMA engine of hardware data processor 306 can then execute the write descriptors to fetch input data 504 from a local memory of network adapter 308 (not shown in the figures) and store input data 504 at local memory 314 of hardware data processor 306. The DMA engine of hardware data processor 306 can then execute the write descriptors to fetch input data 504 from a local memory of network adapter 308 (not shown in the figures) and store input data 504 at local memory 314 of hardware data processor 306.

Figure 5B:
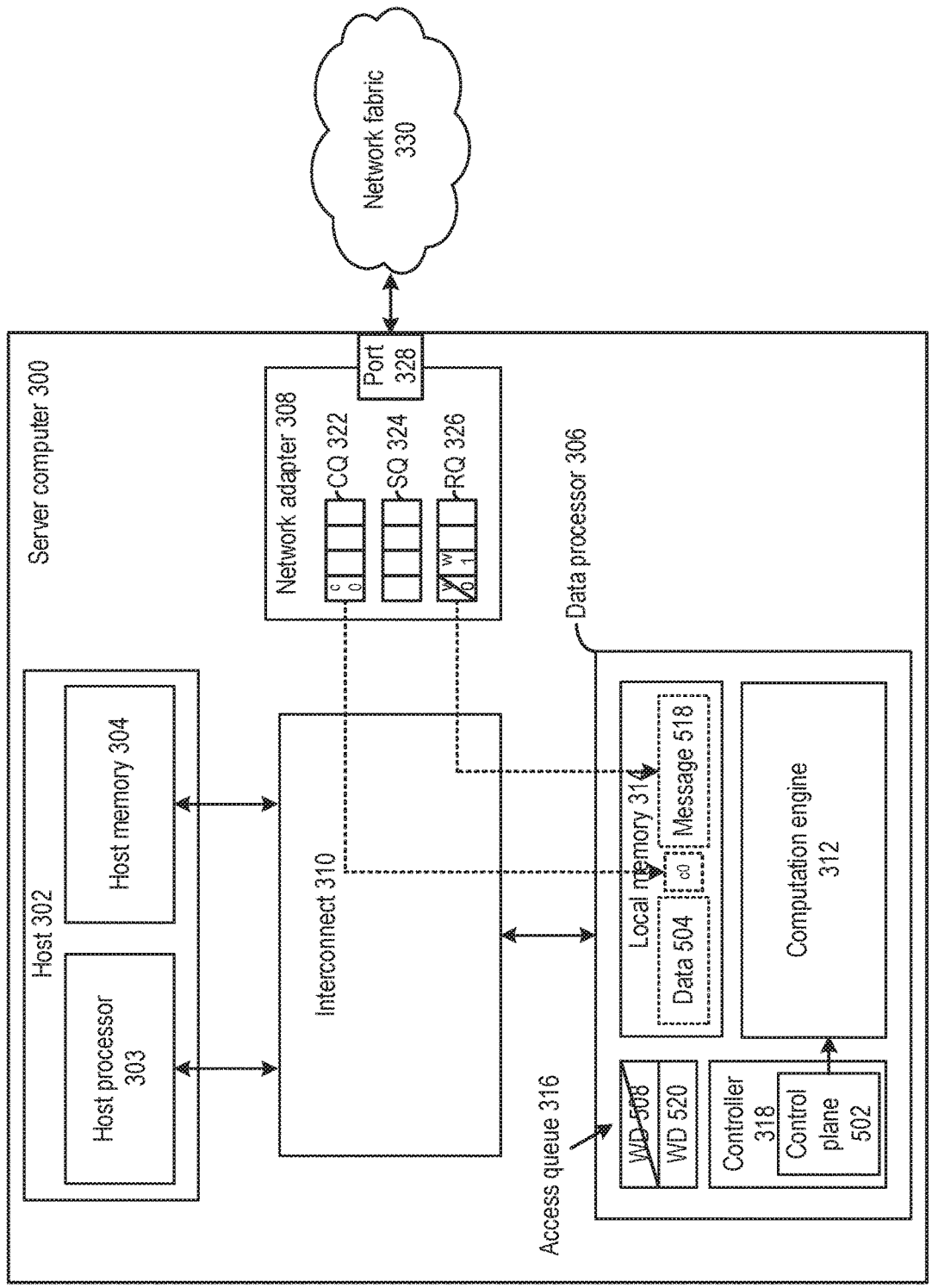

Referring to FIG. 5B, after fetching input data 404 to interconnect 310, network adapter 308 can send a transfer complete message, such as a CQE, to host processor 303. Network adapter 308 can post a CQE ("c0" in FIG. 5B) in the CQ, which can be mapped to local memory 314 of hardware data processor 306, to transmit the CQE to controller 318. In some examples, upon receiving the CQE, controller 318 can trigger computation engine 312 to start a computation operation based on input data 504.

In some examples, the second worker node may send a message 518 after input data 504. Message 518 can be used to trigger controller 318 to complete a flush operation to ensure all of input data 504 is stored at local memory 314. Specifically, upon receiving message 518, a second WQE ("w1") can be posted at RQ 326. Network adapter 308 can then generate write descriptors 508 based on a mapping between RQ 326 and local memory 314, and send write descriptor 520 to hardware data processor 306 to store message 518. Upon receiving write descriptor 520 and storing it at access queue 316 behind write descriptors 508, controller 318 can control the DMA engine to execute all outstanding write descriptors in front of write descriptor 520, including write descriptors 508, to fetch all of input data 504, some of which may be buffered in interconnect 310. After completing the execution of write descriptors 508, the DMA engine can execute write descriptor 520 to store message 518 in local memory 314. Upon detecting that message 518 is stored in local memory 314, controller 318 can trigger computation engine 312 to start the computation operation based on input data 504.

Figure 5C:
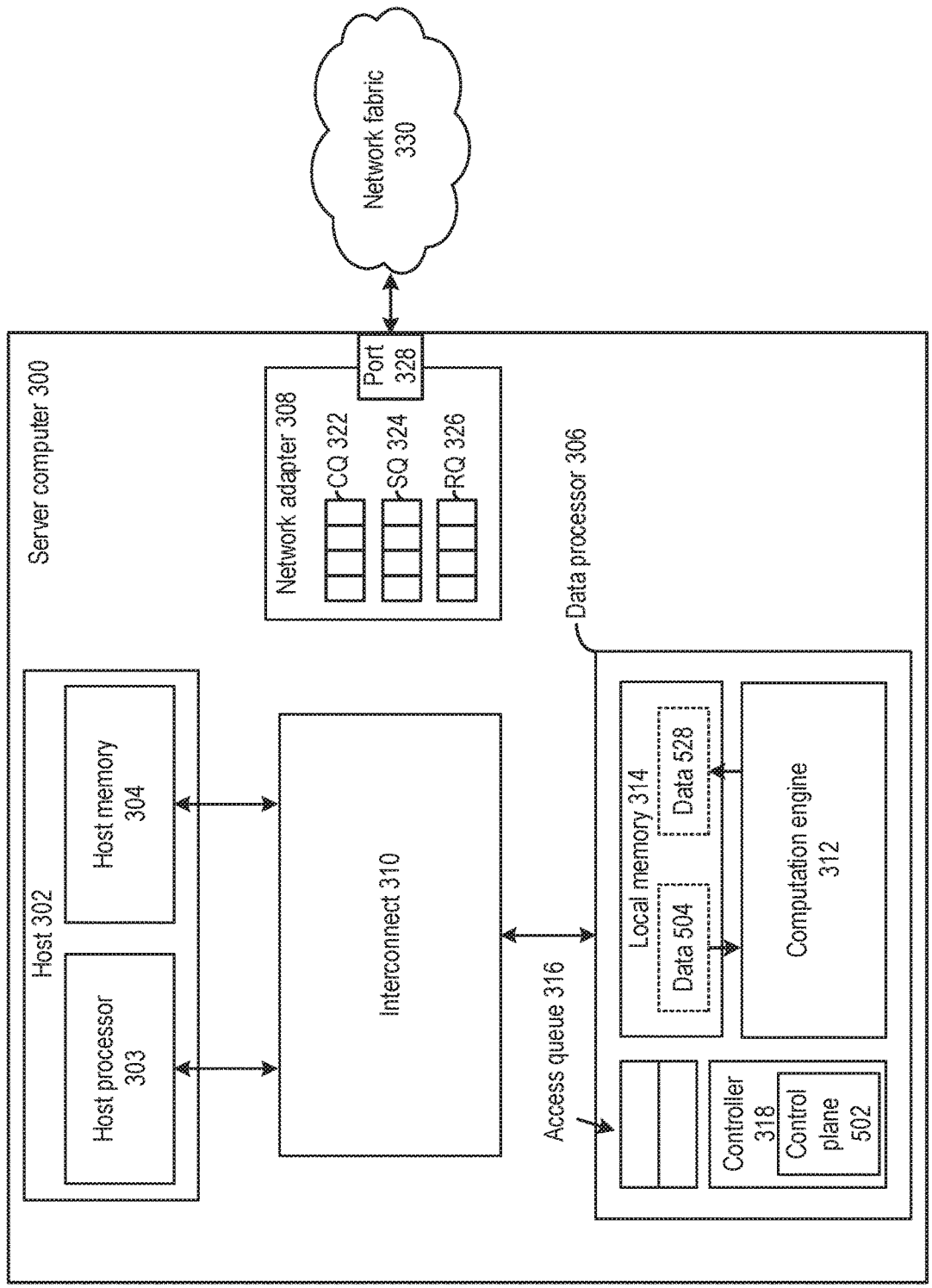

Referring to FIG. 5C, controller 318 can control computation engine 312 to perform the computation operation (e.g., a forward/backward propagation operation, an all-reduce operation) on input data 504 to generate output data 528, and store output data 528 back to local memory 314. In some examples (not shown in FIG. 5C), controller 318 can also control network adapter 308 to transmit a return message back to the second worker node to indicate that hardware data processor 306 has finished consuming input data 504.

Figure 5D:
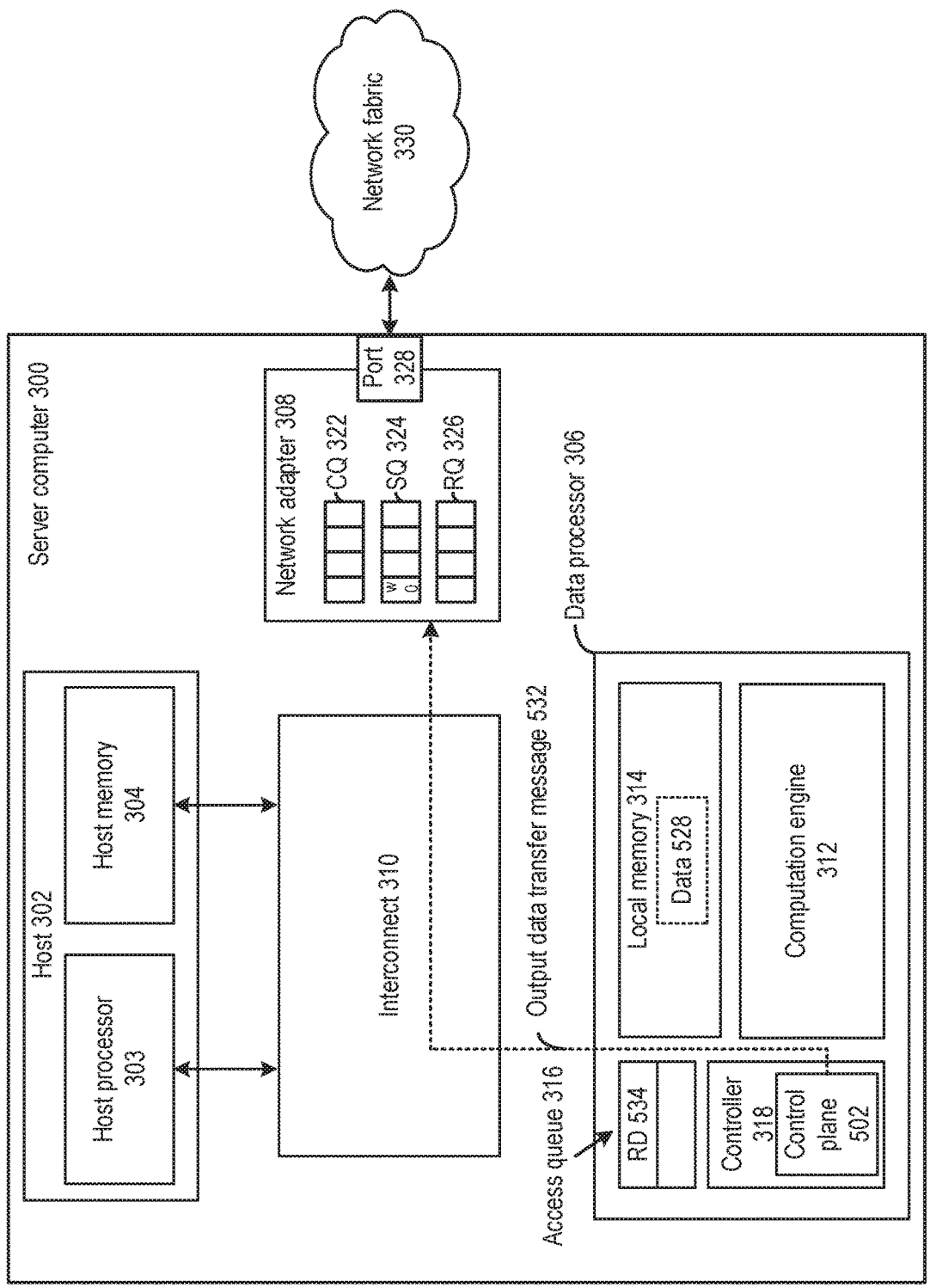

Referring to FIG. 5D, upon completion of the computation operation, controller 318 can send an output data transfer message 532 to network adapter 308 via interconnect 310. Output data transfer message 532 can be sent via a doorbell interrupt signal. Output data transfer message 532 can trigger network adapter 308 to send read descriptors 534 to hardware data processor 306.

Figure 5E:
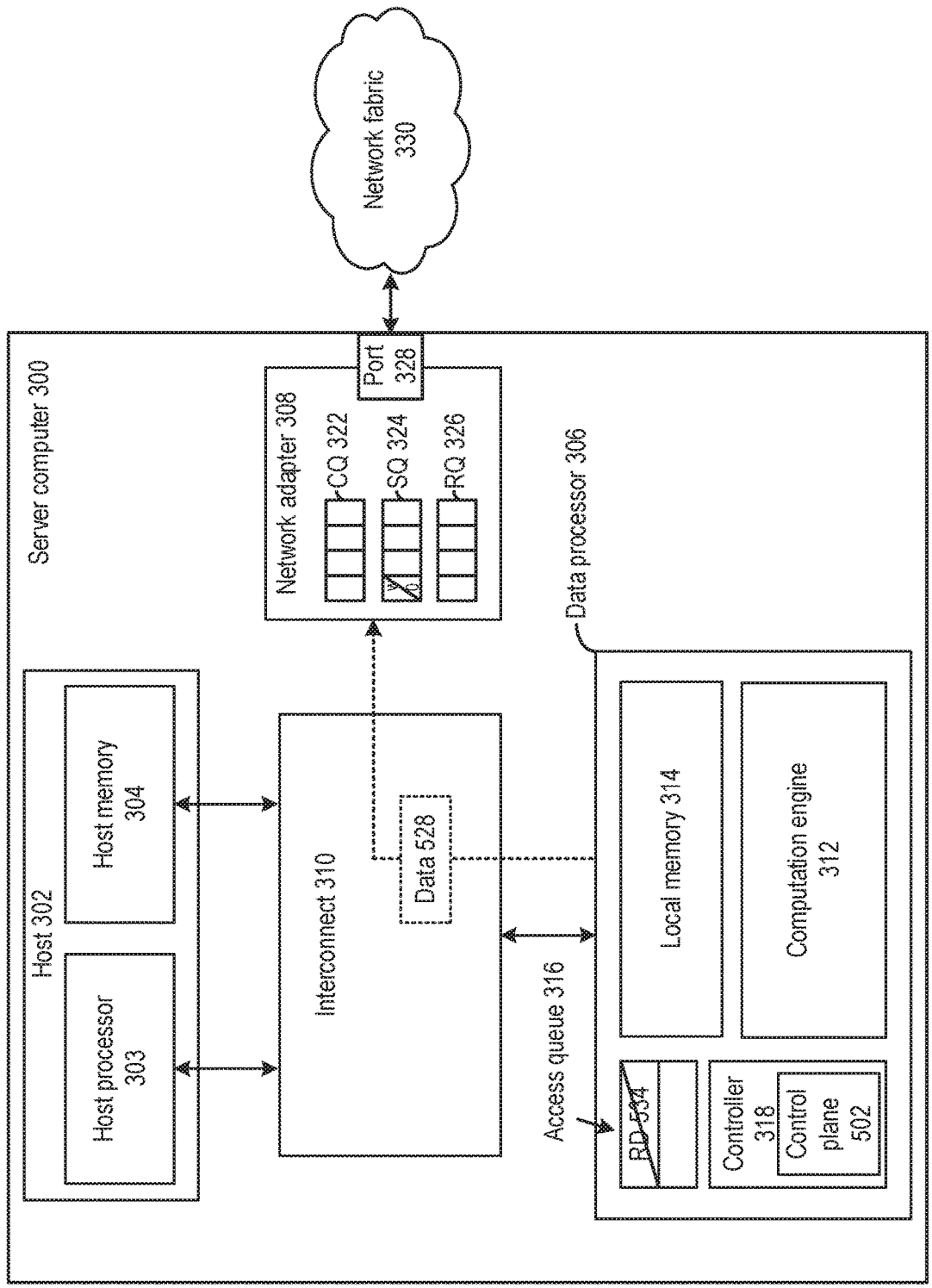

Referring to FIG. 5E, the DMA engine can execute read descriptors 534 and fetch output data 528 to network adapter 308. Network adapter 308 can then generate packets including the output data, and transmit the packets to the network.

With the disclosed techniques where the control plane function is implemented in hardware data processor 306, the delay introduced by the host processor 303 to the generation of data at hardware data processor, and to the transfer of data between the network adapter and the hardware data processor, can be reduced.

Figure 5F:
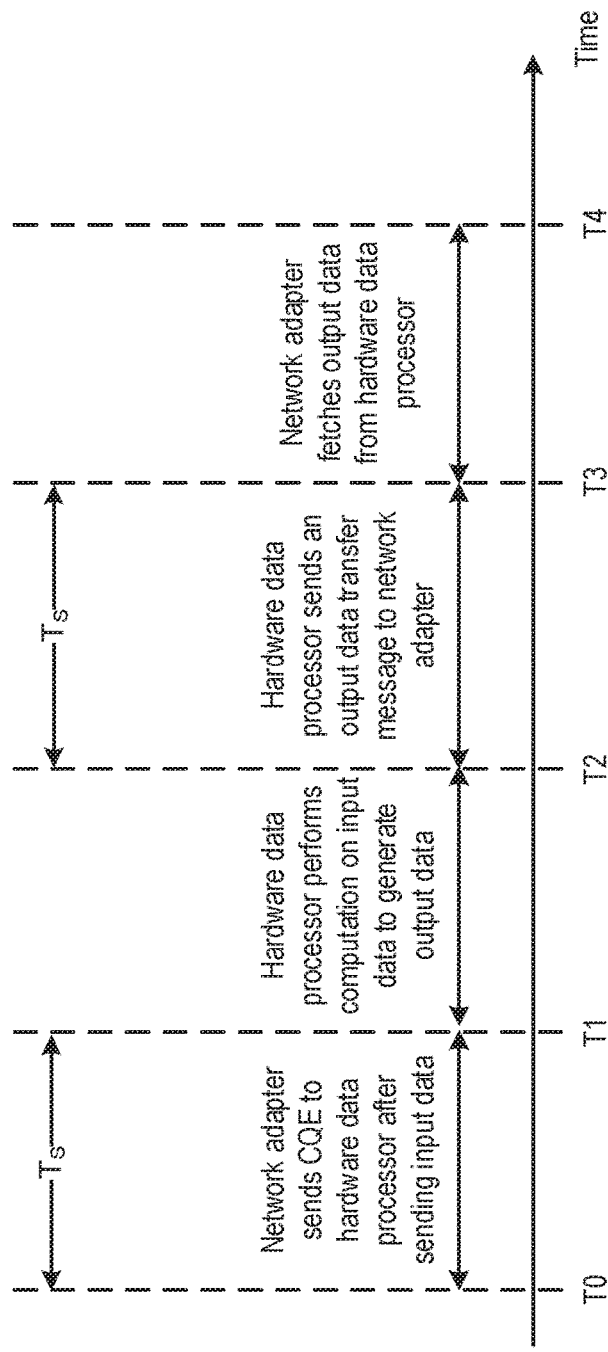

FIG. 5F illustrates an example timing diagram 540 of the sequence of operations in FIG. 4A-FIG. 4E. As shown in FIG. 5F, hardware data processor 306 starts the computation on input data 404 at time T1 after network adapter 308 sends CQE/message 518 to hardware data processor 306 between times T0 and T1, with times T0-T1 spanning a delay $T_S$. Moreover, network adapter 308 fetches output data 418 from hardware data processor 306 at time T4 after hardware data processor 306 sends output data transfer message 532 between times T3 and T4, with times T3-T4 also spanning a delay $T_S$. The delay $T_S$ is typically smaller than the delay $T_R$ as it includes mostly a single-trip delay between hardware data processor 306 and network adapter 308 over interconnect 310 (e.g., caused by flow control blocks, arbiter), as well as the execution delay at controller 318. This can speed up the data generation and data transfer operations and improve the performance of the distributed system in handling a distributed computation operation, such as a distributed training operation of a neural network.

Figure 6A:
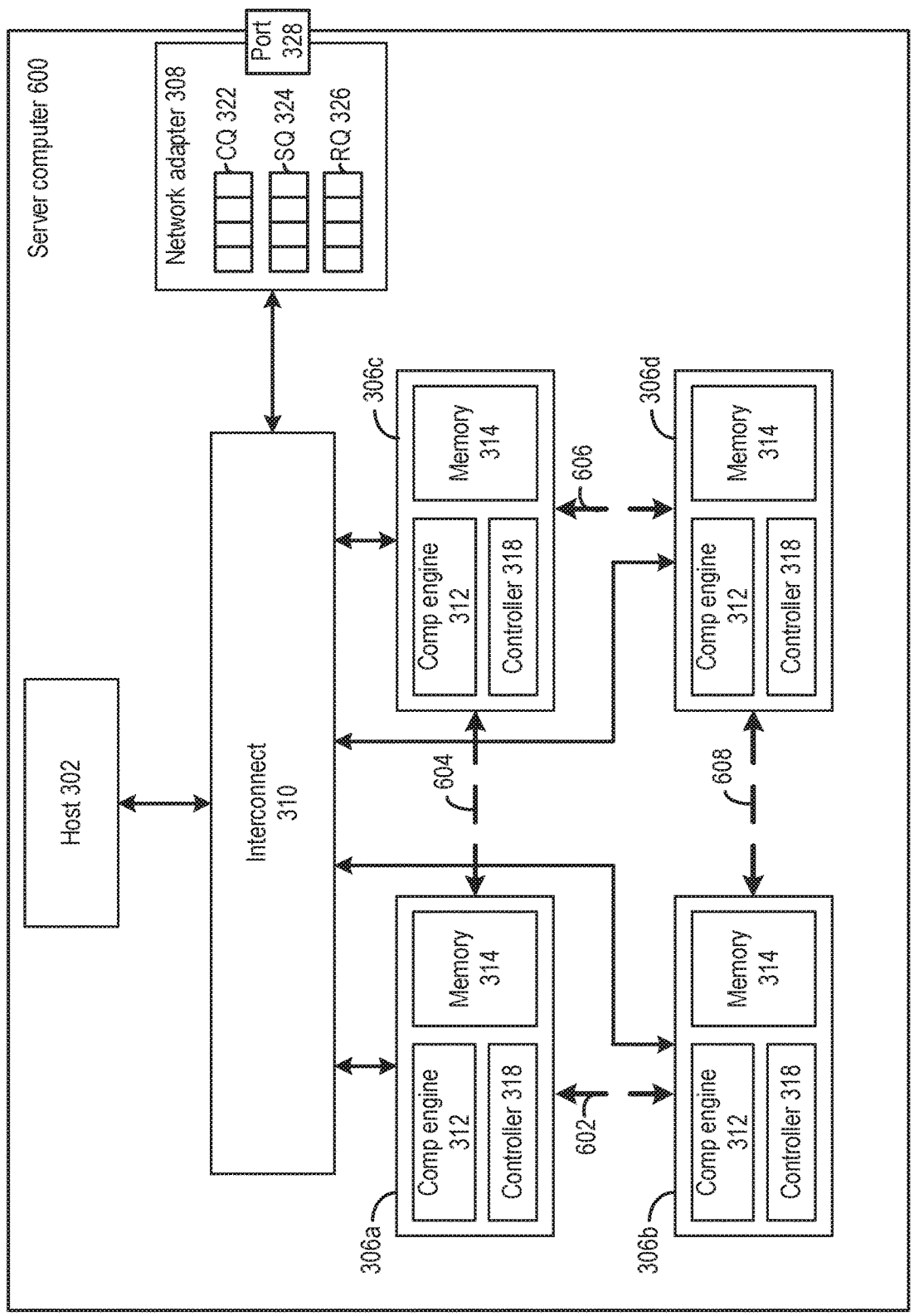
FIG. 6A, FIG. 6B, FIG. 6C, and FIG. 6D illustrate another example of a computing server and data transfer and data generation operations performed by the computing server, according to examples of the present disclosure.

In some examples, hardware data processor 306 can be directly connected to a second hardware data processor via a peer-to-peer interconnect (e.g., a peer-to-peer PCIe interconnect, or other types of peer-to-peer interconnect), and both hardware data processors can implement a control plane function to speed up data generation at the hardware data processors, as well as the data transfer over the peer-to-peer interconnect. FIG. 6A illustrates an example server computer 600 comprising multiple hardware data processors 306a, 306b, 306c, and 306d. Each of hardware data processors 306a, 306b, 306c, and 306d can be connected with host 302 and network adapter 308 via interconnect 310. In addition, the hardware data processors can be interconnected via peer-to-peer interconnects. For example, hardware data processor 306a can be connected with hardware data processor processors 306b and 306c via, respectively, peer-to-peer interconnects 602 and 604. In addition, hardware data processor 306b can also be connected with hardware data processor 306d via a peer-to-peer interconnect 608, whereas hardware data processor 306d can also be connected with hardware data processor 306c via a peer-to-peer interconnect 606. In server computer 600, hardware data processors 306a, 306b, 306c, and 306d can also form a ring topology, in which hardware data processors 306a generate an initial set of partial weight gradients, which then propagate and get updated through hardware data processors 306b, 306d, and 306c via the peer-to-peer interconnects. Hardware data processors 306c can then transmit a final set of partial weight gradients to network adapter 308. The generation of weight gradients at hardware data processor 306c, as well as the transfer of weight gradients from hardware data processor 306c to network adapter 308, can be controlled by a control plane function at controller 318 of hardware data processor 306c, as described in FIG. 5A-FIG. 5F.

In addition, as described above, a hardware data processor can also transmit weight gradients to another hardware data processor via the peer-to-peer interconnect. The generation of weight gradients, as well as the transfer of weight gradients, can be controlled by control plane functions implemented at controller 318 of each hardware data processor.

Figure 6B:
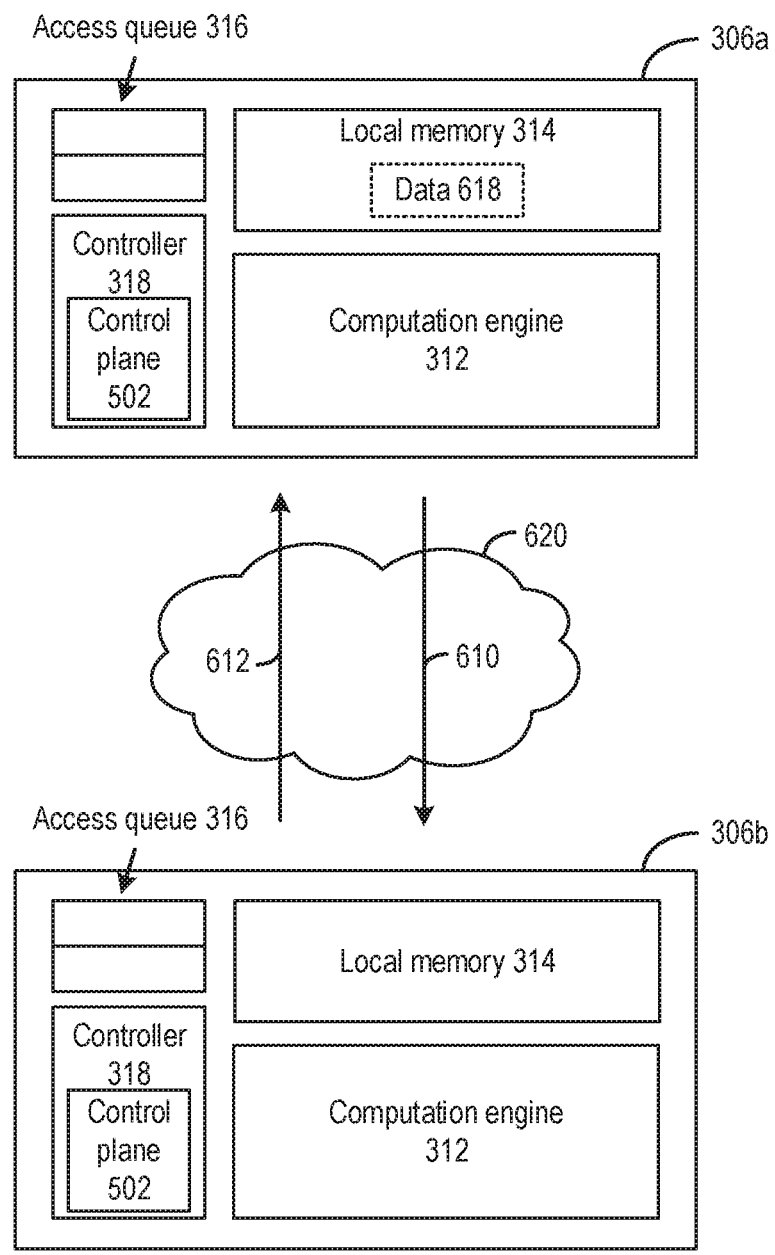

Specifically, referring to FIG. 6B, after computation engine 312 of hardware data processor 306a generates input data 618 and stores the data at local memory 314, controller 318 of hardware data processor 306a can transmit a synchronization message 610, such as a semaphore descriptor, to hardware data processor 306b. The transmission can be over a communication fabric 620, which can include a PCI root-complex interconnect (e.g., interconnect 310), network fabric 330, and peer-to-peer interconnect 602). Synchronization message 610 can indicate that input data 618 is ready. Controller 318 of hardware data processor 306b can also transmit a synchronization message 612 to hardware data processor 306a via communication fabric 620 to indicate that its local memory 314 is ready to receive input data 618.

Figure 6C:
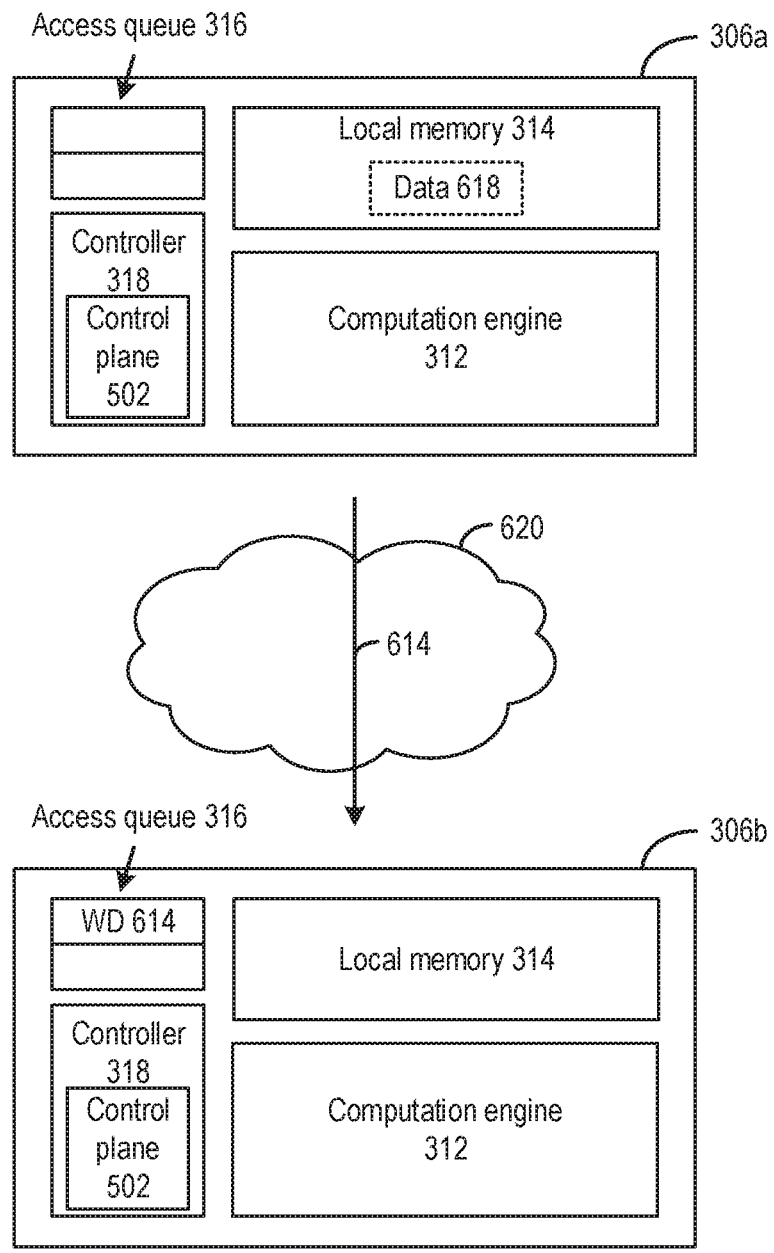

Referring to FIG. 6C, upon receiving second synchronization message 612 and/or sending synchronization message 610, controller 318 of hardware data processor 306a can transmit write descriptors 614 to hardware data processor 306b via communication fabric 620, which can store the write descriptors at access queue 316.

Figure 6D:
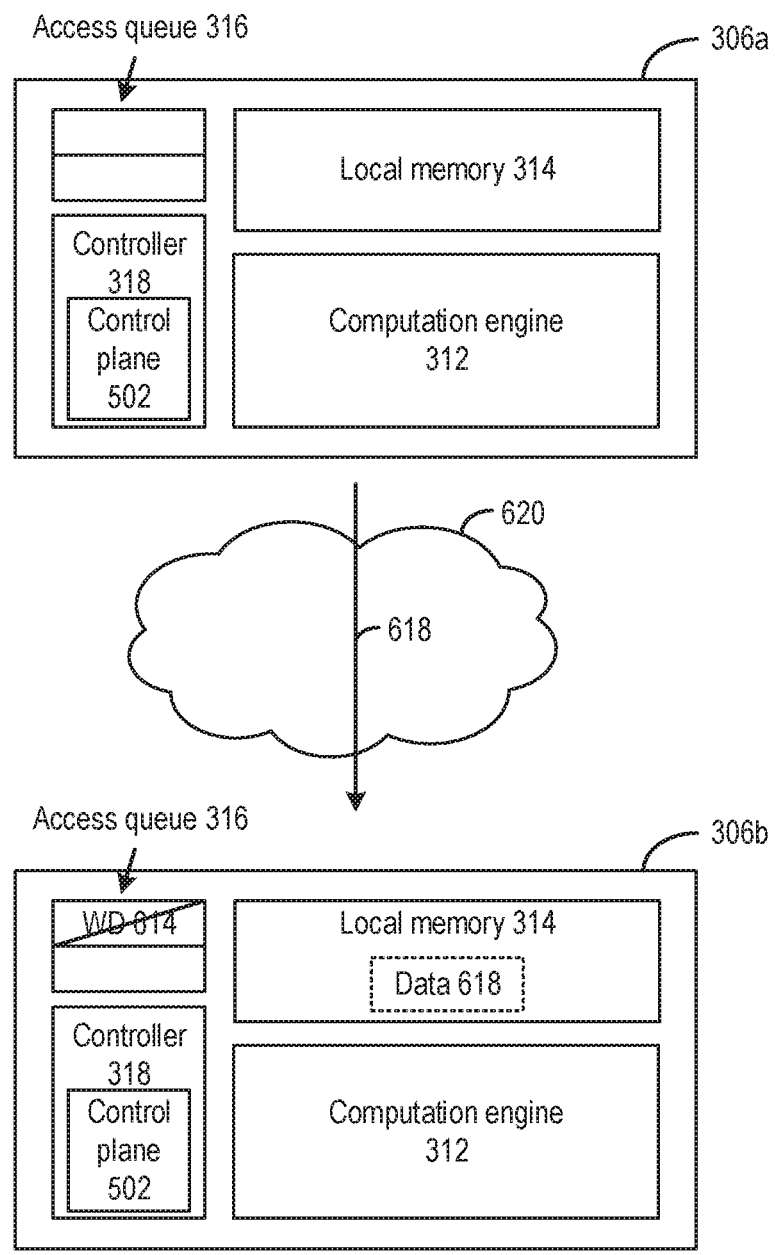

Referring to FIG. 6D, the DMA engine of hardware data processor 306b can then execute the write descriptors to fetch input data 618 from local memory 314 of hardware data processor 306a via communication fabric 620, and store input data 618 at local memory 314 of hardware data processor 306b.

In the disclosed examples of FIG. 5A-FIG. 6D, while the host processor is not directly involved in controlling the generation and transmission of data at the hardware data processor, the host processor may still be involved in other aspects of the operations of the hardware data processor. For example, the host processor may transmit one or more high-level instructions (e.g., via interconnect 310) to the hardware data processor to start or end/suspend an operation (e.g., a training operation, an inferencing operation, etc.). The controller of the hardware data processor can then interact directly with the network adapter to fetch data from the network adapter and start a computation operation on the data without further instruction from the host processor. As another example, the host processor may have access to the local memories of the network adapter and of the hardware data processor to perform various debugging and monitoring operations, as well as error handling operations. For example, as part of the debugging operation, the host processor can set breakpoints or other conditions to start and suspend the execution of the computation operations at the hardware data processor. The host processor can also have access to the data stored at the local memory of the hardware data processor to support the debugging. For example, the hardware processor may transmit a read descriptor to the hardware data processor to fetch the input data and/or output data from the local memory of the hardware data processor to support a monitoring operation. Furthermore, the host processor may also detect a data error based on, for example, the status of the data reception from the CQE, the data stored in the local memory of the hardware data processor, etc. The host processor can handle the error based on pre-determined error handling policies to, for example, suspend or stop the computation operations at the hardware data processor.

Figure 7:
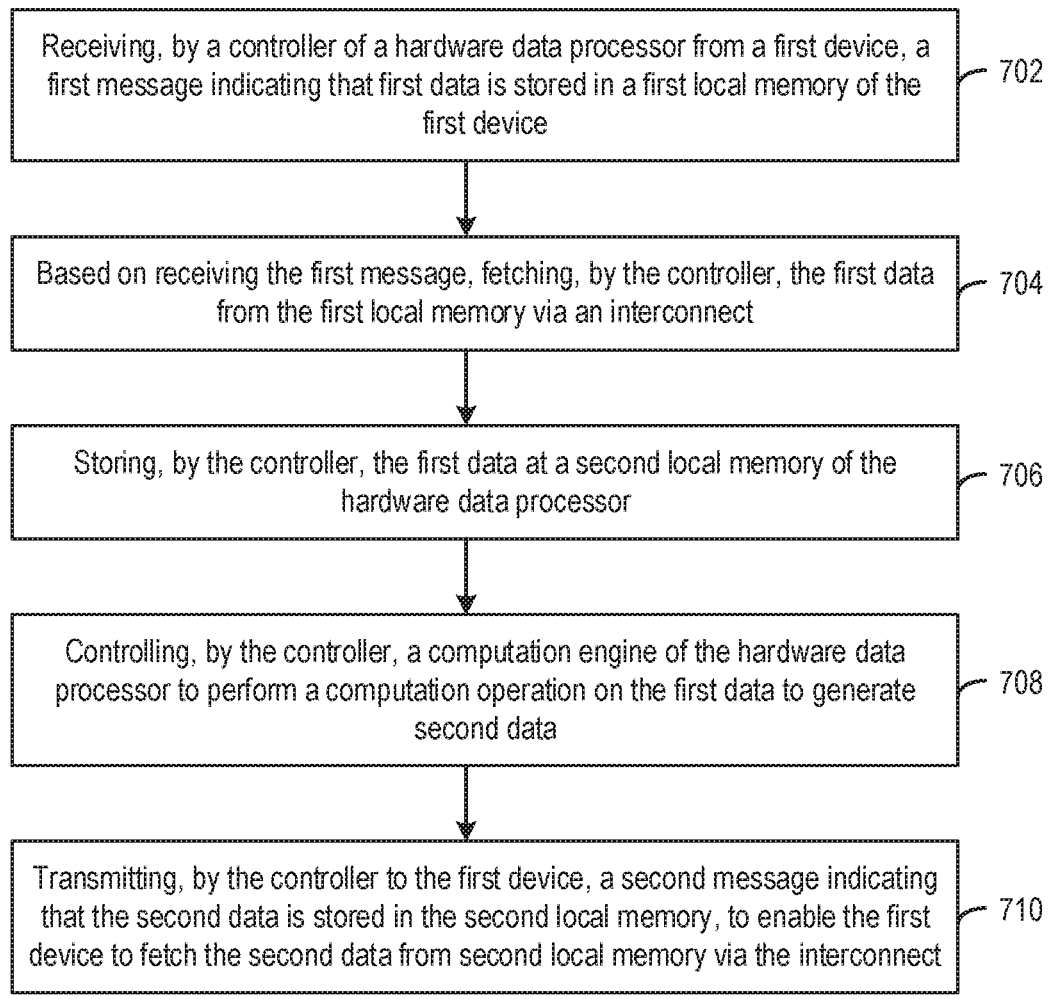
FIG. 7 illustrates an example of a method of performing data transfer, according to examples of the present disclosure.

FIG. 7 illustrates a method 700 of performing a control plane operation to support a movement of data at a computing device, such as server computer 300 of FIG. 5A and server computer 600 of FIG. 6A. The control plane operation can be implemented by a hardware data processor (e.g., hardware data processor 306) of the computing device to control the movement of data in and out of the hardware data processor 306. The hardware data processor 306 can also perform computation operations, such as neural network operations (e.g., an inferencing operation, a training operation, etc.) on the data to support an application hosted on a host processor (e.g., host 302) of the computing device.

Method 700 starts with step 702, in which controller 318 of hardware data processor 306 may receive, from a first device, a first message indicating that first data is stored in a local memory ("first local memory") of the first device. The first device may include a network adapter (e.g., network adapter 308), another hardware data processor, etc., and may be connected to the hardware data processor 306 via an interconnect, such as interconnects 310 and 604. The first message can include, for example, a transfer complete message, such as a CQE, a flush message, such as message 518 of FIG. 5B, a synchronization message such as a semaphore descriptor, etc.

In step 704, based on receiving the first message, controller 318 can fetch the first data from the first local memory via the interconnect. For example, prior to sending the first message, the first device may send write descriptors to the hardware data processor, which can store the write descriptors in an access queue (e.g., access queue 316). Upon receiving the first message, controller can then execute the write descriptors to fetch the first data. In some examples, the first message can include a flush message that triggers controller 318 to perform a flush operation. For example, the first message may be a flush message to be written into a local memory ("second local memory") of the hardware data processor. Upon receiving a write descriptor for the flush message, controller 318 may execute all the pending write descriptors in the access queue before writing the flush message into the second local memory of the hardware data processor.

After fetching of the first data from the first local memory of the first device, the controller can store the first data at the second local memory of the hardware data processor, in step 706.

In step 708, controller 318 may control computation engine 312 to perform a computation operation on the first data to generate second data. The first data may include, for example, remote weight gradients generated by other worker nodes. The computation operation may include, for example, a backward propagation operation to generate local weight gradients, followed by an all reduce operation to combine the remote and local weight gradients to generate combined weight gradients as the second data. Controller 318 can control computation engine 312 based on, for example, receiving the CQE message, detecting that the flush message has been stored in the local memory of the hardware data processor, etc.

In step 710, controller 318 may transmit a second message to the first device to indicate that the second data is stored in the second local memory, and to enable the first device to fetch the second data from second local memory via the interconnect. The second message may include an output data transfer message such as a doorbell interrupt signal, a synchronization message such as another semaphore descriptor, etc.

Figure 8:
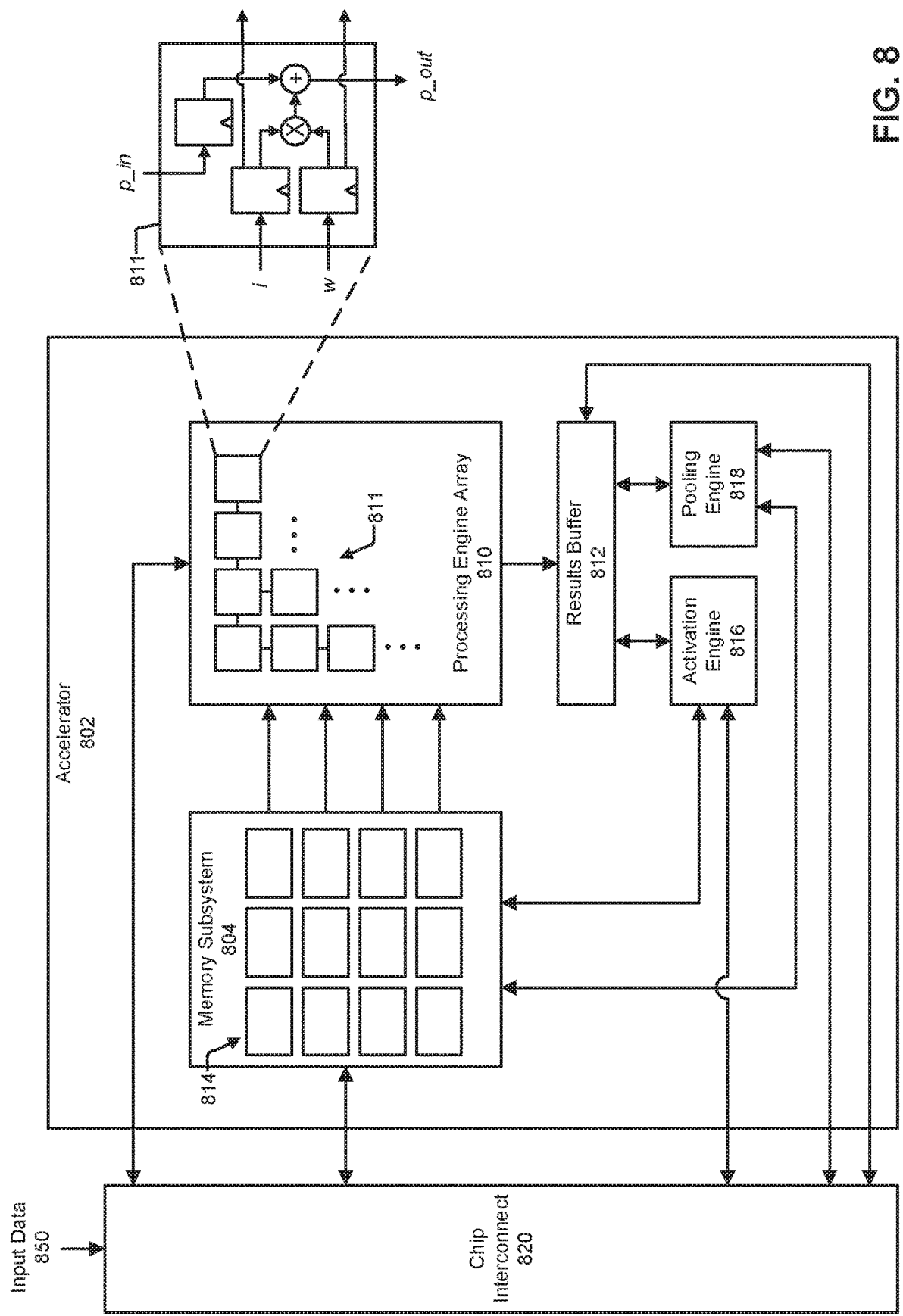
FIG. 8 illustrates an example of an acceleration engine that can be part of the computing server of FIG. 3A and FIG. 6A.

FIG. 8 is a block diagram illustrating an example of an integrated circuit device that can include hardware data processor 306. The example of FIG. 8 illustrates an accelerator 802. In various examples, the accelerator 802, for a set of input data (e.g., input data 850), can execute computations using a processing engine array 810, an activation engine 816, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816 and the pooling engine 818 can include multiple execution channels, each of which can be separate memory clients. The memory banks 814 can be implemented, for example, using SRAM.

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data on which to operate from other processing engines 811, rather than from the memory subsystem 804.

In various examples, the processing engine array 810 uses systolic execution, in which data arrive at each processing engine 811 from different directions at regular intervals. In some examples, input data can flow into the processing engine array 810 from the left and weight values can be loaded at the top. In some examples, weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 428 rows, or some other number of columns and rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p_in, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814, can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include, for example, computing a maximum value, a minimum value, an average value, a median value, a summation, a multiplication, or another logical or mathematical combination. In various examples, the pooling engine 818 can include multiple execution channels that can operate on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

Herein, the activation engine 816 and the pooling engine 818 may be referred to collectively as execution engines. The processing engine array 810 is another example of an execution engine. Another example of an execution engine is a DMA engine, which may be located outside the accelerator 802.

Input data 850 can arrive over the communication fabric 820. The communication fabric 820 can connect the accelerator 802 to other components of a processor, such as a DMA engine that can obtain input data 850 from an I/O device, a storage drive, or a network interface. The input data 850 can be, for example, one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814, or in a separate instruction buffer. The processing engine array 810 can output intermediate results, which represent the outputs of individual layers of the neural network. In some cases, the activation engine 816 and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
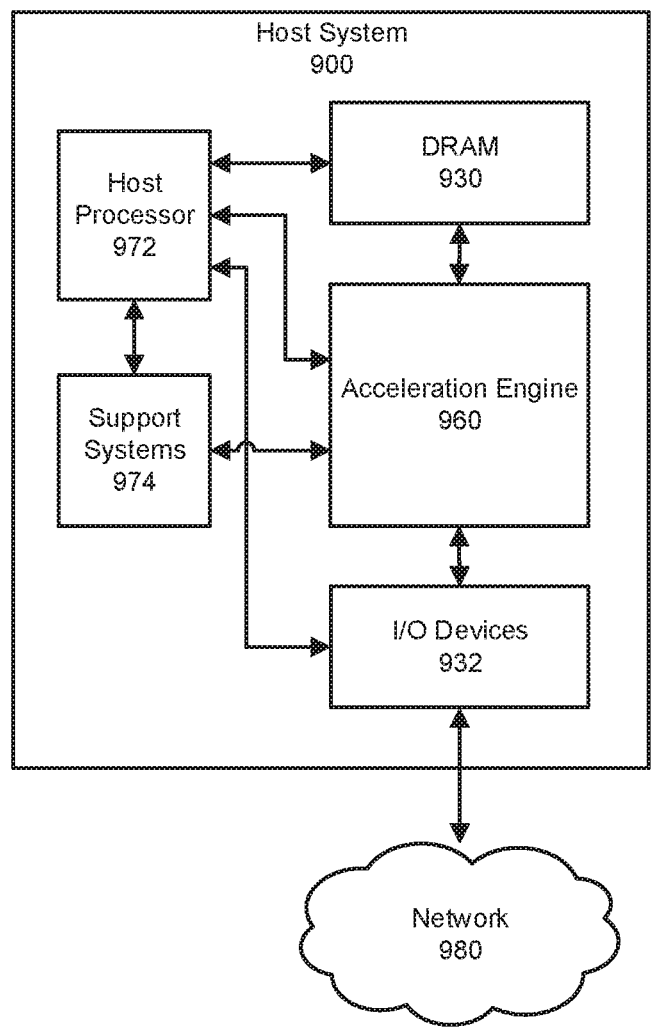
FIG. 9 illustrates an example of a host system that can be part of the computing server of FIG. 3A and FIG. 6A.

FIG. 9 includes a block diagram that illustrates an example of a host system 900, in which an acceleration engine 960 can be used. The acceleration engine 960 of FIG. 9 is an example of a device that can include one or more accelerators, as illustrated in FIG. 8. The example host system 900 of FIG. 9 includes the acceleration engine 960, a host processor 972, DRAM 930 or processor memory, I/O devices 932, and support systems 974. In various implementations, the host system 900 can include other hardware that is not illustrated here.

The host processor 972 is a general-purpose integrated circuit that is capable of executing program instructions. In some examples, the host processor 972 can include multiple processing cores. A multi-core processor may include multiple processing units within the same processor. In some examples, the host system 900 can include more than one host processor 972. In some examples, the host processor 972 and the acceleration engine 960 can be one chip, such as one or more integrated circuits within the same package.

In various examples, the host processor 972 can communicate with other components in the host system 900 over one or more communication channels. For example, the host system 900 can include a host processor bus, which the host processor 972 can use to communicate with the DRAM 930, for example. As another example, the host system 900 can include an I/O bus, such as a Peripheral Component Interconnect (PCI)-based bus, over which the host processor 972 can communicate with the acceleration engine 960 and/or the I/O devices 932. In various examples, the host system 900 can, alternatively or additionally, include other communication channels or buses, such as serial buses, power management buses, storage device buses, and so on.

In some examples, software programs executing on the host processor 972 can receive or generate input for processing by the acceleration engine 960. In some examples, the programs can select an appropriate neural network to execute for a given input. For example, a program may be for language translation and can select one or more neural networks capable of speech recognition and/or machine translation. In these and other examples, the programs can configure the acceleration engine 960 with the neural network to execute and/or can select a neural network processing engine on the acceleration engine 960 that has previously been configured to execute the desired neural network. In some examples, once the acceleration engine 960 has started an inference on input data, the host processor 972 can manage the movement of data (such as weights, instructions, intermediate results, results of conditional layers, and/or final results) into or out of the acceleration engine 960.

In some examples, a software program that is using the acceleration engine 960 to conduct an inference can read the result from a conditional layer from the acceleration engine 960 and/or from a storage location, such as in DRAM 930. In these examples, the program can determine what action the neural network should take next. For example, the program can determine to terminate the inference. As another example, the program can determine to change the direction of the inference, which can be translated by lower-level code and/or the neural network processor to a next layer to execute. In these and other examples, the execution flow of the neural network can be coordinated by software.

The DRAM 930 is memory that is used by the host processor 972 for storage of program code that the host processor 972 is in the process of executing, as well as values that are being operated on. In some examples, the data for a neural network (e.g., weight values, instructions, and other data) can be all or partially stored in the DRAM 930. DRAM is a common term for processor memory, and though DRAM is volatile memory, processor memory can be volatile and/or non-volatile. Though not illustrated here, the host system 900 can include other volatile and non-volatile memories for other purposes. For example, the host system 900 can include a read-only memory (ROM) that stores boot code for booting the host system 900 at power on, and/or basic input/output System (BIOS) code.

Though not illustrated here, the DRAM 930 can store instructions for various programs, which can be loaded into and be executed by the host processor 972. For example, the DRAM 930 can store instructions for an operating system, one or more data stores, one or more application programs, one or more drivers, and/or services for implementing the features disclosed herein.

The operating system can manage and orchestrate the overall operation of the host system 900, such as scheduling tasks, executing applications, and/or controller peripheral devices, among other operations. In some examples, a host system 900 may host one or more virtual machines. In these examples, each virtual machine may be configured to execute its own operating system. Examples of operating systems include Unix, Linux, Windows, Mac OS X, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 900. For example, some drivers can provide communication between the operating system and peripheral devices or I/O devices 932. Alternatively or additionally, some drivers may provide communication between application programs and the operating system and/or application programs and peripheral devices accessible to the host system 900. In many cases, the drivers can include drivers that provide well-understood functionality (e.g., printer drivers, display drivers, hard disk drivers, solid-state device drivers). In other cases, the drivers may provide proprietary or specialized functionality.

The I/O devices 932 can include hardware for connecting to user input and output devices, such as keyboards, mice, pens, tablets, voice input devices, touch input devices, displays or monitors, speakers, and printers, among other devices. The I/O devices 932 can also include storage drives and/or network interfaces for connecting to a network 980. For example, the host system 900 can use a network interface to communicate with storage devices, user terminals, other computing devices or servers, and/or other networks, among various examples.

In various examples, one or more of the I/O devices 932 can be storage devices. In these examples, the storage devices include non-volatile memory and can store program instructions and/or data. Examples of storage devices include magnetic storage, optical disks, solid-state disks, flash memory, and/or tape storage, among others. The storage device can be housed in the same chassis as the host system 900 or may be in an external enclosure. A storage device can be fixed (e.g., attached by screws) or removable (e.g., having a physical release mechanism and possibly a hot-plug mechanism).

Storage devices, the DRAM 930, and any other memory component in the host system 900 are examples of computer-readable storage media. Computer-readable storage media are physical mediums that are capable of storing data in a format that can be read by a device, such as the host processor 972. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid-state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 932 can be PCI-based devices. In these examples, a PCI-based I/O device includes a PCI interface for communicating with the host system 900. The terms "PCI" or "PCI-based" may be used to describe any protocol in the PCI family of bus protocols, including the original PCI standard, PCI-X, Accelerated Graphics Port (AGP), and PCIe or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-My allows a physical resource (e.g., a single network interface controller) to appear as multiple virtual resources (e.g., 64 network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). PFs are fully featured functions of the device that can be discovered, managed, and manipulated. PFs have configuration resources that can be used to configure or control the storage adapter device. PFs include the same configuration address space and memory address space that a non-virtualized device would have. A PF may have a number of VFs associated with it. VFs are similar to PFs, but are lightweight functions that may generally lack configuration resources, and are generally controlled by the configuration of their underlying physical functions. Each of the PFs and/or VFs may be assigned to a respective thread of execution (such as for example, a virtual machine) running on a host device.

In various implementations, the support systems 974 can include hardware for coordinating the operations of the acceleration engine 960. For example, the support systems 974 can include a microprocessor that coordinates the activities of the acceleration engine 960, including moving around data on the acceleration engine 960. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more-limited capability than the host processor 972. In some examples, the program executed by the microprocessor is stored on the hardware of microprocessor or on a non-volatile memory chip in the host system 900. In some examples, the microprocessor and the acceleration engine 960 can be on-chip, such as one integrated circuit on the same die and in the same package.

In some examples, the support systems 974 can be responsible for taking instructions from the host processor 972 when programs executing on the host processor 972 request the execution of a neural network. For example, the host processor 972 can provide the support systems 974 with a set of input data and a task that is to be performed on the set of input data. In this example, the support systems 974 can identify a neural network that can perform the task, and can program the acceleration engine 960 to execute the neural network on the set of input data. In some examples, the support systems 974 only need to select an appropriate neural network processing engine of the neural network processor. In some examples, the support systems 974 may need to load the data for the neural network onto the acceleration engine 960 before the acceleration engine 960 can start executing the neural network. In these and other examples, the support systems 974 can further receive the output of executing the neural network, and provide the output back to the host processor 972.

In some examples, the operations of the support systems 974 can be handled by the host processor 972. In these examples, the support systems 974 may not be needed and can be omitted from the host system 900.

In various examples, the host system 900 can include a combination of host systems, processor nodes, storage subsystems, and I/O chassis that represent user devices, service-provider computers, or third-party computers.

User devices can include computing devices to access an application (e.g., a web browser or mobile device application). In some examples, the application may be hosted, managed, and/or provided by a computing resources service or service provider. The application may enable a user to interact with the service-provider computer to, for example, access web content (e.g., web pages, music, video). The user device may be a computing device such as, for example, a mobile phone, a smartphone, a personal digital assistant (PDA), a laptop computer, a netbook computer, a desktop computer, a thin-client device, a tablet computer, an electronic book (e-book) reader, or a gaming console. In some examples, the user device may be in communication with the service-provider computer over one or more networks. Additionally, the user device may be part of the distributed system managed by, controlled by, or otherwise part of the service-provider computer (e.g., a console device integrated with the service-provider computers).

The host system 900 can also represent one or more service-provider computers. A service-provider computer may provide a native application that is configured to run on user devices, which users may interact with. The service-provider computer may, in some examples, provide computing resources such as, but not limited to, client entities, low-latency data storage, durable data storage, data access, management, virtualization, cloud-based software solutions, electronic content performance management, and so on. The service-provider computer may also be operable to provide web hosting, databasing, computer application development and/or implementation platforms, combinations of the foregoing, or the like. In some examples, the service-provider computer may be provided as one or more virtual machines implemented in a hosted computing environment. The hosted computing environment can include one or more rapidly provisioned and released computing resources. These computing resources can include computing, networking, and/or storage devices. A hosted computing environment may also be referred to as a cloud-computing environment. The service-provider computer may include one or more servers, perhaps arranged in a cluster, as a server farm, or as individual servers not associated with one another, and may host application and/or cloud-based software services. These servers may be configured as part of an integrated, distributed computing environment. In some examples, the service-provider computer may, additionally or alternatively, include computing devices such as, for example, a mobile phone, a smartphone, a PDA, a laptop computer, a desktop computer, a netbook computer, a server computer, a thin-client device, a tablet computer, and/or a gaming console. In some instances, the service-provider computer may communicate with one or more third-party computers.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning including, but not limited to), unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer server, comprising:
   a host processor configured to host an application;
   a network adapter coupled with a network;
   a hardware data processor comprising a local memory, a computation engine, and a controller; and
   an interconnect coupled between the host processor, the network adapter, and the hardware data processor;
   wherein the network adapter is configured to:
      receive first network packets from the network, the first network packets including input data;
      transmit the input data to the interconnect to enable the interconnect to transmit the input data to the hardware data processor;
      responsive to completing the transmission of the input data to the interconnect, store a completion queue element (CQE) at a completion queue of the network adapter; and
      transmit the CQE to the hardware data processor; and
   wherein the controller of the hardware data processor is configured to:
      receive the CQE from the network adapter;
      responsive to receiving the CQE, fetch the input data buffered in the interconnect, and store the fetched input data at the local memory;
      responsive to storing the fetched input data at the local memory, control the computation engine to perform a first computation operation on the input data to generate output data to support the application hosted by the host processor; and
      transmit an output data transfer message to the network adapter after storing the output data at the local memory; and
   wherein the network adapter is configured to, responsive to receiving the output data transfer message:
      fetch the output data from the local memory of the hardware data processor;
      generate second network packets including the output data; and
      transmit the second network packets to the network.

2. The computer server of claim 1, wherein the network adapter is configured to:
   receive a second message from the network after receiving the first network packets; and
   transmit the second message to the hardware data processor; and
   wherein the controller of the hardware data processor is configured to, responsive to receiving the second message:
      perform a flush operation to fetch any remaining portion of the input data buffered in the interconnect; and
      control the computation engine to perform the first computation operation on the input data to generate output data.

3. The computer server of claim 1, wherein the output data transfer message comprises a doorbell interrupt signal.

4. The computer server of claim 1, wherein the host processor is configured to:
   transmit a first instruction to the hardware data processor to start an execution of a sequence of computation operations including the first computation operation for the application;
   monitor a status of the execution of the sequence of computation operations at the computation engine of the hardware data processor; and
   transmit a second instruction to halt the execution of the sequence of computation operations based on the status; and
   wherein the controller is configured to start and then halt the execution of the sequence of computation operations at the computation engine based on, respectively, the first instruction and the second instruction.

5. The computer server of claim 1, wherein the input data include partial averaged weight gradients generated by other worker nodes; and
   wherein the first computation operation comprises performing a backward propagation operation to generate local weight gradients and combining the local weight gradients with the partial averaged weight gradients to generate, as part of the output data, updated partial averaged weight gradients.

6. An apparatus comprising:
   a first local memory;
   a computation engine configured to generate local data and to store the local data at the first local memory; and
   a controller;
   wherein the apparatus is coupled with a host processor and a second device via an interconnect, the second device comprising a second local memory, the host processor hosting an application; and
   wherein the controller is configured to:
      receive, from the second device, a first message indicating that first data is stored in the second local memory;
      based on the first message:
         fetch the first data from the second local memory via the interconnect;
         store the first data at the first local memory;
         control the computation engine to perform a computation operation on the first data to generate second data to support the application hosted by the host processor; and
      transmit, to the second device, a second message indicating that the second data is stored in the first local memory, to enable the second device to fetch the second data from the first local memory via the interconnect; and
      wherein the first data stored at the first local memory is accessible by the host processor to enable the host processor to monitor a status of execution of the computation operation at the computation engine.

7. The apparatus of claim 6, further comprising a direct memory access (DMA) engine and an access queue;
   wherein the controller is configured to:
      receive write descriptors from the second device;
      store the write descriptors in the access queue;
      control the DMA engine to fetch the write descriptors from the access queue and to execute the write descriptors to fetch the first data from the second local memory via the interconnect;
receive read descriptors from the second device;
store the read descriptors in the access queue; and
control the DMA engine to fetch the read descriptors from the access queue and to execute the read descriptors to transmit the second data to the second device via the interconnect.

8. The apparatus of claim 6, wherein the interconnect comprises at least one of: a Peripheral Component Interconnect Express (PCIe) root-complex switch, or a PCIE peer-to-peer link.

9. The apparatus of claim 6, wherein the first data includes partial averaged weight gradients generated by other worker nodes; and
wherein the computation operation comprises performing a backward propagation operation to generate local weight gradients and combining the local weight gradients with the partial averaged weight gradients to generate, as part of the second data, updated partial averaged weight gradients.

10. The apparatus of claim 7, wherein the second device comprises a network adapter that implements a completion queue to track a status of processing of network packets; and
wherein the first message comprises a CQE indicating that the network adapter has extracted the first data from a set of network packets received from a network and initialized a transfer of the first data to the apparatus via the interconnect.

11. The apparatus of claim 7, wherein the second device comprises a second hardware data processor; and
wherein each of the first message and the second message comprises a synchronization message.

12. The apparatus of claim 7, wherein the computation operation is a first computation operation; and
wherein the apparatus is configured to:
receive, from the host processor and via the interconnect, a first instruction to start an execution of a sequence of computation operations including the first computation operation for the application;
based on the first message and the first instruction, control the computation engine to perform the first computation operation;
receive, from the host processor and via the interconnect, a second instruction to halt the execution of the sequence of computation operations based on the status of execution; and
based on the second instruction, control the computation engine to stop the execution of the sequence of computation operations.

13. The apparatus of claim 10, wherein the network adapter receives a third message after the set of network packets;
wherein the controller is configured to:
receive, from the second device, a second write descriptor to store the third message at the first local memory;
store the second write descriptor in the access queue;
based on receiving the second write descriptor, control the DMA engine to execute all outstanding write descriptors in the access queue in front of the second write descriptor to fetch all of the first data buffered in the interconnect;
store the third message at the first local memory; and
responsive to storing the third message, control the computation engine to perform the computation operation on the first data to generate the second data.

14. The apparatus of claim 10, wherein the second message comprises a doorbell interrupt signal.

15. The apparatus of claim 12, wherein the second instruction is generated based on at least one of: a break-point condition being satisfied, or an error condition being detected.

16. The apparatus of claim 12, wherein the controller is configured to:
receive, from the host processor and via the interconnect, a second read descriptor to read the first data or the second data from the first local memory; and
control the DMA engine to execute the second read descriptor to fetch the first data or the second data to the host processor to support a monitoring operation.

17. A method comprising:
receiving, by a controller of a hardware data processor from a first device, a first message indicating that first data is stored in a first local memory of the first device;
based on receiving the first message, fetching, by the controller, the first data from the first local memory via an interconnect;
storing, by the controller, the first data at a second local memory of the hardware data processor;
controlling, by the controller, a computation engine of the hardware data processor to perform a computation operation on the first data to generate second data; and
transmitting, by the controller to the first device, a second message indicating that the second data is stored in the second local memory, to enable the first device to fetch the second data from second local memory via the interconnect.

18. The method of claim 17, wherein the first device comprises a network adapter device that implements a completion queue to track a status of processing of network packets; and
wherein the first message comprises a CQE indicating that the network adapter device has extracted the first data from a set of network packets received from a network and initialized a transfer of the first data to the hardware data processor via the interconnect.

19. The method of claim 17, wherein the computation operation is a first computation operation; and
wherein the method further comprises:
receiving, from a host processor and via the interconnect, an instruction to start a sequence of computation operations including the first computation operation; and
based on the first message and the instruction, controlling the computation engine to perform the first computation operation.

20. The method of claim 18, wherein the second message comprises a doorbell interrupt signal.

* * * * *